United States Patent
Sugiki

(10) Patent No.: US 8,858,084 B2
(45) Date of Patent: Oct. 14, 2014

(54) ROTATING DEVICE AND COMPONENT FOR FLUID DYNAMIC BEARING UNIT THEREOF

(75) Inventor: Ryusuke Sugiki, Fujieda (JP)

(73) Assignee: Samsung Electro-Mechanics Japan Advanced Technology Co., Ltd., Fujieda, Shizuoka Prefecture (JP)

( * ) Notice: Subject to any disclaimer, the term of this patent is extended or adjusted under 35 U.S.C. 154(b) by 64 days.

(21) Appl. No.: 13/316,798

(22) Filed: Dec. 12, 2011

(65) Prior Publication Data

US 2012/0183243 A1    Jul. 19, 2012

(30) Foreign Application Priority Data

Jan. 17, 2011 (JP) ................................ 2011-006827
May 31, 2011 (JP) ................................ 2011-121322
May 31, 2011 (JP) ................................ 2011-121981

(51) Int. Cl.
*F16C 32/06* (2006.01)
*F16C 17/10* (2006.01)
*G11B 19/20* (2006.01)
*F16C 33/74* (2006.01)

(52) U.S. Cl.
CPC ............. *F16C 33/745* (2013.01); *F16C 17/107* (2013.01); *F16C 2370/12* (2013.01); *G11B 19/2036* (2013.01)
USPC ......................................................... 384/114

(58) Field of Classification Search
USPC ............... 384/100, 107, 114, 121; 360/98.07, 360/98.08, 99.04; 310/90
See application file for complete search history.

(56) References Cited

U.S. PATENT DOCUMENTS

| | | | |
|---|---|---|---|
| 5,533,811 A | 7/1996 | Polch et al. | |
| 7,825,557 B2 * | 11/2010 | Drautz et al. | ................... 310/90 |
| 7,982,349 B2 | 7/2011 | Popov et al. | |
| 8,277,125 B2 | 10/2012 | Kimura et al. | |
| 8,337,086 B2 | 12/2012 | Oe et al. | |
| 8,427,778 B2 * | 4/2013 | Yamada et al. | ............ 360/98.07 |
| 2003/0231813 A1 * | 12/2003 | Gomyo et al. | ................ 384/107 |
| 2007/0145837 A1 * | 6/2007 | Herndon et al. | ............ 310/67 R |
| 2007/0176503 A1 * | 8/2007 | Yajima | ............................ 310/90 |
| 2010/0277833 A1 * | 11/2010 | Sugiki | ............................ 360/224 |
| 2010/0315742 A1 * | 12/2010 | Kimura et al. | ................ 360/224 |
| 2013/0033137 A1 * | 2/2013 | Yu | ................................... 310/90 |
| 2013/0147308 A1 * | 6/2013 | Yu | .......................... 310/216.001 |
| 2013/0163120 A1 * | 6/2013 | Kodama et al. | ............ 360/234.3 |
| 2013/0216166 A1 * | 8/2013 | Kodama et al. | ............... 384/100 |

FOREIGN PATENT DOCUMENTS

JP    2009-162246 A    7/2009
JP    2010-127448 A    6/2010

* cited by examiner

*Primary Examiner* — Thomas R Hannon
*Assistant Examiner* — Adam D Rogers
(74) *Attorney, Agent, or Firm* — Holtz, Holtz, Goodman & Chick PC

(57) ABSTRACT

A rotating device includes a fixed body having a base and a shaft, a hub, and a rotating body having a rotating-body-side encircling member fixed to the hub and encircling the shaft. A lubricant is present between the fixed body and the rotating body. The rotating-body-side encircling member and the shaft are each formed with a radial dynamic pressure generating groove. The fixed body includes a base-side encircling member having a disk part encircling the base-side portion of the shaft and a cylinder part encircling the rotating-body-side encircling member. The base-side encircling member has the disk part fixed to the shaft by interference fitting, and has the cylinder part fixed to the base. An air-liquid interface is located in a gap in the radial direction between the inner periphery of the cylinder part and the outer periphery of the rotating-body-side encircling member.

20 Claims, 10 Drawing Sheets

ROTATING DEVICE AND COMPONENT FOR FLUID DYNAMIC BEARING UNIT THEREOF

CROSS-REFERENCE TO RELATED APPLICATION

The present application claims the priorities based on Japanese Patent Application No. 2011-006827 filed on Jan. 17, 2011, Japanese Patent Application No. 2011-121322 filed on May 31, 2011 and Japanese Patent Application No. 2011-121981 filed on May 31, 2011, the entire disclosures of which are herein incorporated by reference in this specification.

BACKGROUND OF THE INVENTION

1. Field of the Invention

The present invention relates to a rotating device that has a shaft fixed to a fixed body.

2. Description of the Related Art

Disk drive devices like a hard disk drive are well developed for reduction in size and increase of a volume, and are built in various electronic devices. In particular, such disk drive devices are nowadays built in portable electronic devices, such as a laptop computer and a portable music player. In comparison with disk drive devices built in a so-called stationary electronic device like a desktop PC (Personal Computer), resistances against shock and vibration are necessary for disk drive devices built in such portable electronic devices so as to withstand against a shock due to a falling and a vibration during a carriage.

For example, JP 2009-162246 A and JP 2010-127448 A disclose motors having a shaft fixed to a base plate and having a bearing that employs a fluid dynamic bearing mechanism.

According to the conventional shaft-fixed motors disclosed in JP 2009-162246 A and JP 2010-127448 A, a dynamic pressure generator is formed in the direction of a rotation axis R so as to be held between two tapered seals. According to this structure, however, when the thickness of a motor is restricted, it is necessary to reduce the dimension of the dynamic pressure generator in the direction of the rotation axis R. This reduces the rigidity of a bearing and harms the resistances of the motor against shock and vibration.

Alternatively, it is necessary to reduce the dimension of the tapered seal in the direction of the rotation axis R. In this case, in order to maintain the lubricant retaining amount by the tapered seal, if a space in a radial direction is increased, capillary force becomes poor. When the capillary force by the tapered seal becomes poor, the lubricant often leaks out.

Such a technical issue arises in the cases of not only the motors but also other kinds of rotating devices, in particular, a rotating device having a shaft fixed to a fixed body and employing a fluid dynamic bearing.

The present invention has been made in view of such a circumstance, and it is an object of the present invention to provide a rotating device which allows improvement of the rigidity of a bearing or which reduces the leak-out of a lubricant.

SUMMARY OF THE INVENTION

A first aspect of the present invention provides a rotating device. The rotating device includes: a fixed body including a base and a shaft fixed to the base; a rotating body including a rotating-body-side encircling member that encircles the shaft and a hub which is fixed to the rotating-body-side encircling member and on which a recording disk is to be mounted; a lubricant continuously present between the rotating body and the fixed body from one air-liquid interface to an other air-liquid interface; a first dynamic pressure generating groove formed in either one of an inner periphery of the rotating-body-side encircling member and an outer periphery of the shaft; and a second dynamic pressure generating groove formed in either one of the inner periphery of the rotating-body-side encircling member and the outer periphery of the shaft so as to be distant from the first dynamic pressure generating groove in an axial direction, a distance between the two air-liquid interfaces of the lubricant in the axial direction being shorter than a distance from a portion of the first dynamic pressure generating groove opposite to the second dynamic pressure generating groove to a portion of the second dynamic pressure generating groove opposite to the first dynamic pressure generating groove.

A second aspect of the present invention provides a rotating device. The rotating device includes: a fixed body including a base and a shaft fixed to the base; a rotating body including a hub on which a recording disk is to be mounted, and a rotating-body-side encircling member which is fixed to a hub opening provided in the hub and which encircles the shaft; a lubricant continuously present between the fixed body and the rotating body, the lubricant including at least a first air-liquid interface and a second air-liquid interface; and a radial dynamic pressure generating groove which is formed in either one of surfaces of the rotating-body-side encircling member and the shaft where the lubricant contacts, and which generates radial dynamic pressure, the fixed body further including a base-side encircling member comprising a disk part that encircles a base-side portion of the shaft and a cylinder part that encircles the rotating-body-side encircling member, and the first air-liquid interface being located in a gap in a radial direction between an inner periphery of the cylinder part and an outer periphery of the rotating-body-side encircling member.

A third aspect of the present invention provides a rotating device. The rotating device includes: a fixed body including a base and a shaft fixed to the base; a rotating body including a hub on which a recording disk is to be mounted and a rotating-body-side encircling member which is fixed to a hub opening provided in the hub and which encircles the shaft; a lubricant continuously present between the fixed body and the rotating body; and a radial dynamic pressure generating groove which is formed in either one of surfaces of the rotating-body-side encircling member and the shaft where the lubricant contacts, and which generates radial dynamic pressure, the fixed body further including a base-side encircling member comprising a disk part that encircles a base-side portion of the shaft and a cylinder part that encircles the rotating-body-side encircling member, and the base-side encircling member being integrally formed with the shaft, and having the cylinder part bonded and fixed to a through hole provided in the base.

Any combination of the above-explained structural elements and replacement of the structural element and expression of the present invention between a method, a device, and a system are also effective as an embodiment of the present invention.

According to the present invention, the rigidity of a bearing can be improved or the leak-out of a lubricant can be reduced.

DETAILED DESCRIPTION OF THE PREFERRED EMBODIMENTS

Figure 1A:
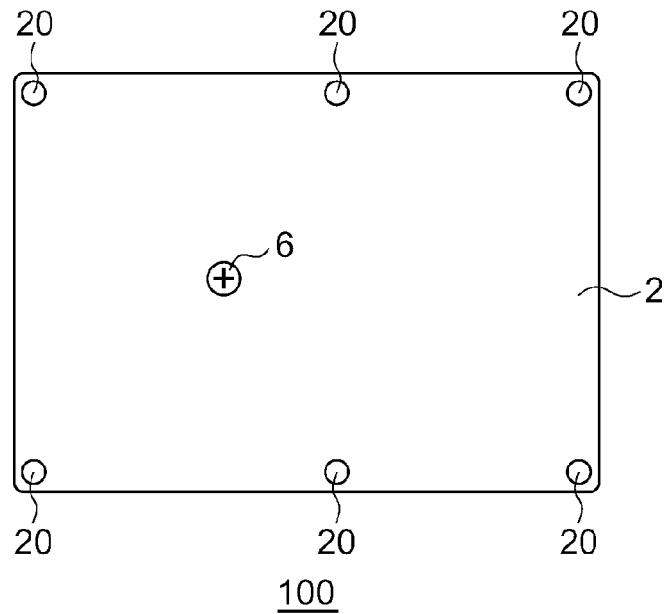
FIG. 1A is a diagram showing a rotating device according to a first embodiment of the present invention.

The present invention will be explained together with preferred embodiments thereof with reference to the accompanying drawings. The same or similar structural elements and members shown in respective figures are denoted by the same reference numeral, and the duplicated explanation will be omitted as needed. The dimension of a member in each figure is enlarged or scaled down accordingly in order to facilitate understanding for the present invention. Some of the members not important for explaining the detail of the present invention in each figure will be shown in an abbreviated manner.

The rotating devices of the embodiments are suitable as a disk drive device like a hard disk drive on which a magnetic recording disk is loaded and which rotates such a disk, in particular, a shaft-fixed type disk drive device which has a shaft fixed to a base and which has a hub rotating relative to the shaft.

First Embodiment

Figure 1B:
FIG. 1B is a diagram showing the rotating device of the first embodiment.
Figure 1C:
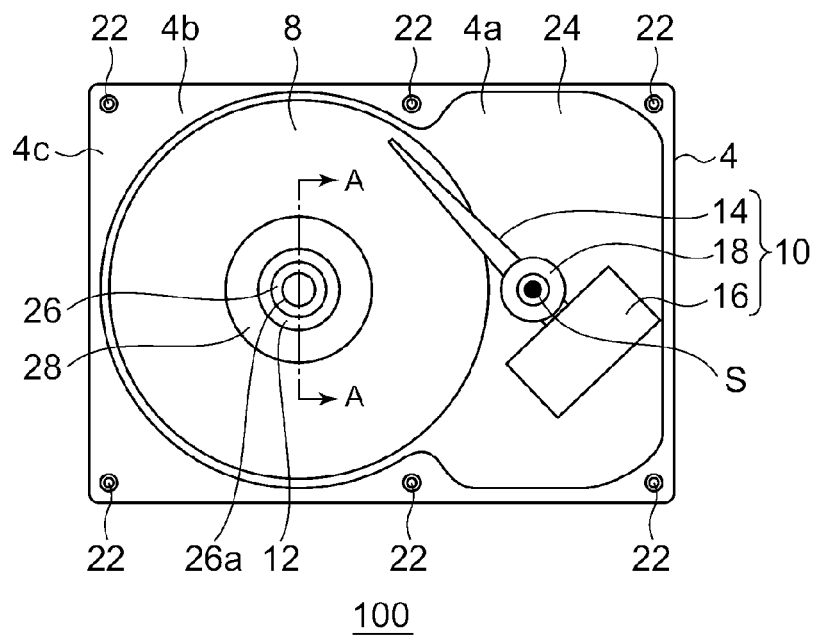
FIG. 1C is a diagram showing the rotating device of the first embodiment.

FIGS. 1A to 1C are diagrams showing a rotating device 100 according to a first embodiment. FIG. 1A is a top view of the rotating device 100. FIG. 1B is a side view of the rotating device 100. FIG. 1C is a top view of the rotating device 100 with a top cover 2 being detached. The rotating device 100 includes a fixed body, a rotating body that rotates relative to the fixed body, a magnetic recording disk 8 that is attached to the rotating body, and a data reading/writing unit 10. The fixed body includes a base 4, a shaft 26 fixed to the base 4, the top cover 2, six screws 20, and a shaft fixing screw 6. The rotating body includes a hub 28.

The explanation below will be given based on a definition that a side where the hub 28 is mounted to the base 4 is an upper side.

The magnetic recording disk 8 is a 2.5 inch magnetic recording disk formed of a glass and having a diameter of 65 mm, and has a center opening with a diameter of 20 mm and a thickness of 0.65 mm. The hub 28 loads the two magnetic recording disks 8.

The base 4 is formed and shaped by die-casting on an aluminum alloy. The base 4 includes a bottom member 4a forming the bottom of the rotating device 100, and an external peripheral wall member 4b formed along the external periphery of the bottom member 4a so as to surround the location where the magnetic recording disks 8 are mounted. The external peripheral wall member 4b has six screw holes 22 formed in a top face 4c thereof.

The data reading/writing unit 10 includes a recording/playing head (unillustrated), a swing arm 14, a voice coil motor 16, and a pivot assembly 18. The recoding/playing head is attached to the tip of the swing arm 14, records data in the magnetic recording disks 8, and reads the data therefrom. The pivot assembly 18 supports the swing arm 14 in a swingable manner to the base 4 around a head rotating shaft S. The voice coil motor 16 allows the swing arm 14 to swing around the head rotating shaft S to move the recording/playing head to a desired location over the top face of the magnetic recording disk 8. The voice coil motor 16 and the pivot assembly 18 are configured based on a conventionally well-known technology of controlling the position of a head.

The top cover 2 is fixed to the top face 4c of the external peripheral wall member 4b of the base 4 using six screws 20. The six screws 20 correspond to the six screw holes 22, respectively. In particular, the top cover 2 and the top face 4c of the external peripheral wall member 4b are fixed to each other so that no leak into the interior of the rotating device 100 occurs at the joined portion therebetween. The interior of the rotating device 100 means, more specifically, a clean space 24 defined by the bottom member 4a of the base 4, the external peripheral wall member 4b thereof, and the top cover 2. The clean space 24 is designed so as to be hermetically closed, i.e., no leak-in from the exterior or no leak-out to the exterior occurs. The clean space 24 is filled with clean air having particles eliminated. Hence, adhesion of foreign materials like particles to the magnetic recording disks 8 is suppressed, thereby increasing the reliability of the operation of the rotating device 100.

The shaft 26 has a shaft fixing screw hole 26a provided in a top end face. The shaft 26 has a bottom fixed to the base 4 by a technique to be discussed later. The shaft fixing screw 6 passes all the way through the top cover 2 and is screwed in the shaft fixing screw hole 26a, and thus the top end of the shaft 26 is fixed to the top cover 2. The top cover 2 is fixed to the base 4.

Among the shaft-fixed type rotating devices, the rotating device that fixes both ends of the shaft 26 to chassis, such as the base 4 and the top cover, can improve the resistances against shock and vibration. According to the rotating device of this type, when a fluid dynamic bearing is used, in general, a lubricant has two air-liquid interfaces. According to the rotating device 100 of the present embodiment, instead of simply arranging the two air-liquid interfaces and a dynamic pressure generating groove in a line in the direction of a rotation axis R (a direction along the rotation axis R), the passage of a lubricant is turned back so as to expand in the radial direction. Accordingly, the passages of the lubricant partially overlap in the direction of the rotation axis R. Hence, when the thickness of the rotating device 100 is restricted, it is possible to increase the ratio of a portion corresponding to the dynamic pressure generating groove to the whole thickness. As a result, the bearing span that is the dimension of the dynamic pressure generating groove in the axial direction is extended, thereby improving the rigidity of a bearing. Moreover, the distance between the two air-liquid interfaces can be reduced. As a result, the leak-out of the lubricant due to the gravity acting on the lubricant and the pressure difference between the two air-liquid interfaces can be suppressed.

Figure 2:
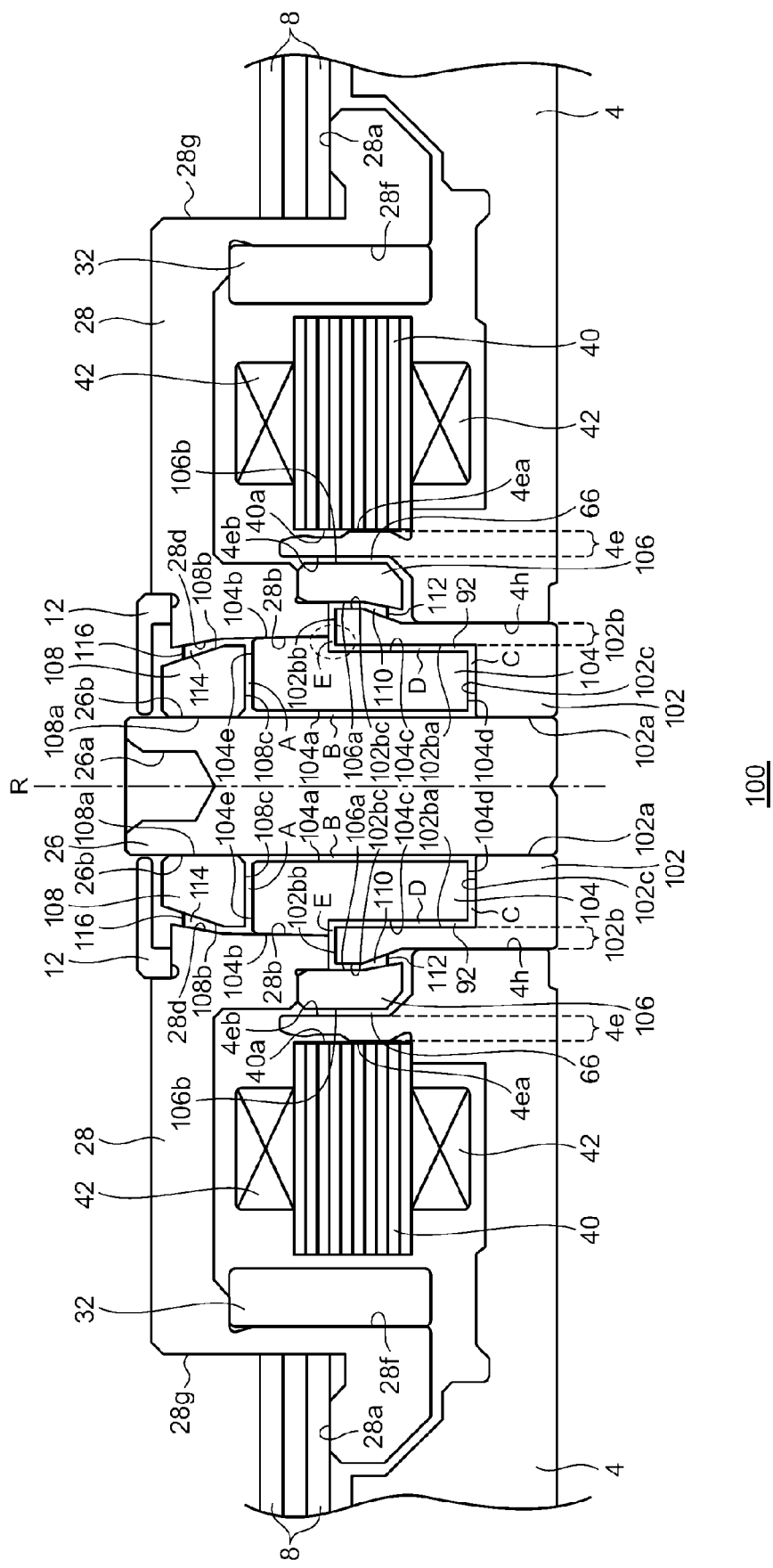
FIG. 2 is a cross-sectional view taken along a line A-A in FIG. 1C.

FIG. 2 is a cross-sectional view taken along a line A-A in FIG. 1C.

The rotating body includes the hub 28, a cylindrical magnet 32, a rotating-body-side encircling member 104, an external-side encircling member 106, and a cap 12.

The fixed body includes the base 4, a stacked core 40, a coil 42, a base-side encircling member 102, the shaft 26, and a hub-side encircling member 108.

A lubricant 92 is continuously present in a part of the space between the rotating body and the fixed body.

The magnetic recording disk 8 is mounted on a disk mounting face 28a of the hub 28. The hub 28 is formed of an iron-and-steel material with a soft magnetic property like SUS430F. The hub 28 is formed by, for example, pressing and cutting an iron-and-steel plate, and is formed in a predetermined shape like a cup having a center opening along the rotation axis R. An example iron-and-steel material preferable for the hub 28 is stainless steel like one produced as DHS1 by DAIDO Steel Co., Ltd., which has little out-gas, and is easy to process. Moreover, stainless steel with a production name DHS2 by the same company is further preferable due to a better corrosion resistance.

The cylindrical magnet 32 is bonded and fixed to a cylindrical inner periphery 28f corresponding to the internal cylindrical surface of the hub 28 in a cup-like shape. The cylindrical magnet 32 is formed of a rare earth material, such as neodymium, iron, and born, and faces twelve protrusions of the stacked core 40 in the radial direction. Polarization with 16 poles for driving is performed on the cylindrical magnet 32 in the circumferential direction. A corrosion prevention treatment is performed on the surface of the cylindrical magnet 32 by electrodeposition coating, spray coating, etc.

The rotating-body-side encircling member 104 is a cylindrical member that encloses the shaft 26. The rotating-body-side encircling member 104 has a radial dynamic pressure generating groove to be discussed later provided in an inner periphery 104a of the rotating-body-side encircling member 104. The rotating-body-side encircling member 104 includes a first outer periphery 104b, and a second outer periphery 104c which has a smaller diameter than the first outer periphery 104b and which is provided under the first outer periphery 104b. The rotating-body-side encircling member 104 has the first outer periphery 104b fitted in a center opening 28b of the hub 28, and thus the rotating-body-side encircling member 104 is fixed to the hub 28. The rotating-body-side encircling member 104 is bonded to the center opening 28b of the hub 28. A passage D of a lubricant 92 formed as a gap between the second outer periphery 104c and the base-side encircling member 102 overlaps a passage B of the lubricant 92 formed as a gap between the inner periphery 104a and (a side face 26b of) the shaft 26 in the direction of the rotation axis R.

The stacked core 40 includes an annular part and the twelve protrusions extending therefrom outwardly in the radial direction, and is fixed to the top face of the base 4. The stacked core 40 is formed by stacking, for example, 10 thin electromagnetic steel plates and integrating those together by caulking. An insulative coating is performed on the surface of the stacked core 40 by electrodeposition coating, powder coating, etc. A coil 42 is wound around each protrusion of the stacked core 40. When a driving current of a substantially sine wave with three phases flows through the coil 42, driving magnetic fluxes are generated along the protrusions.

The base 4 has a through hole 4h provided along the rotation axis R of the rotating body. The base-side encircling member 102 has a cross section substantially L-shape, and is bonded and fixed to the through hole 4h. The base-side encircling member 102 encloses the lower part of the shaft 26. That is, the base-side encircling member 102 has a shaft opening 102a along the rotation axis R of the rotating body, and the bottom end of the shaft 26 is fitted in the shaft opening 102a.

The bottom end of the shaft 26 is fixed to the base-side encircling member 102 by, in particular, interference fitting. Such interference fitting is accomplished by, for example, pressing the shaft 26 in the shaft opening 102a, shrink fitting, or inserting the shaft 26 cooled by a liquid nitrogen in the shaft opening 102a, and then letting the shaft 26 to be a normal temperature. It is fine if bonding is further applied together with the interference fitting.

The base-side encircling member 102 includes a cylinder part 102b in a cylindrical shape that encloses the rotating-body-side encircling member 104. A space between an inner periphery 102ba of the cylinder part 102b and the second outer periphery 104c of the rotating-body-side encircling member 104 forms a passage D of the lubricant 92. A space between an upper end face 102bb of the cylinder part 102b and a face at the rotor side facing the end face 102bb in the direction of the rotation axis R forms a passage E of the lubricant 92. The cylinder part may be formed separately from the base-side encircling member and may be attached thereto. When the cylinder part 102b is formed together with the other parts of the base-side encircling member 102 according to the embodiment of the present invention, the number of parts can be reduced.

A space between a bottom end face 104d of the rotating-body-side encircling member 104 and an opposing face 102c of the base-side encircling member 102 facing the end face 104d in the direction of the rotation axis R forms a passage C of the lubricant 92.

The external-side encircling member 106 is cylindrical which encloses the cylinder part 102b and is fixed to the hub 28. Formed between the external-side encircling member 106 and the cylinder part 102b is a first capillary seal 110 that is a part where the space between an inner periphery 106a of the external-side encircling member 106 and an outer periphery 102bc of the cylinder part 102b gradually becomes widespread downwardly. The first capillary seal 110 includes a first air-liquid interface 112 of the lubricant 92, and prevents the lubricant 92 from leaking out by a capillary phenomenon. The first air-liquid interface 112 of the lubricant 92 contacts the outer periphery 102bc of the cylinder part 102b. In order to further suppress the leak-out of the lubricant 92, the first capillary seal 110 may have an area where an oil-repelling agent is applied around the outlet of such a seal.

The base 4 includes a cylindrical protrusion 4e along the rotation axis R of the rotating body. The protrusion 4e protrudes from the top face of the base 4 so as to enclose the external-side encircling member 106. An outer periphery 4ea of the protrusion 4e is fitted in a center opening 40a of the annular part of the stacked core 40, and thus the stacked core 40 is fixed to the base 4. The annular part of the stacked core 40 is bonded and fixed to the protrusion 4e by, in particular, press-in or loose fit. The protrusion 4e and the external-side encircling member 106 form a labyrinth seal 66. Regarding the labyrinth seal 66, in particular, a thickness of a cylindrical space (a space gap) between an inner periphery 4eb of the protrusion 4e and the outer periphery 106b of the external-side encircling member 106 is set to be equal to or smaller than $1/5$ of a height of the cylindrical space (a length of the cylindrical space), thereby suppressing a smooth flow of air on some level. In this case, a vaporization of the lubricant 92 can be suppressed, thereby extending the lifetime of the rotating device 100.

The hub-side encircling member 108 encloses the upper part of the shaft 26 and is fixed to the shaft 26. The hub-side encircling member 108 is substantially cylindrical around the rotation axis R of the rotating body, and has a center opening 108a where the shaft 26 is fitted. The hub-side encircling member 108 is fixed to the shaft 26 by interference fitting to the upper part of the shaft 26.

Formed between the hub-side encircling member 108 and the hub 28 is a second capillary seal 114 that is a part where the space between a seal forming surface 28d of the hub 28 and an outer periphery 108b of the hub-side encircling member 108 gradually becomes widespread upwardly. The second capillary seal 114 has a second air-liquid interface 116 of the lubricant 92, and prevents the lubricant 92 from leaking out by a capillary phenomenon. In order to further suppress the leak-out of the lubricant 92, the second capillary seal 114 may have an area where an oil-repelling agent is applied around the outlet of such a seal.

A space between an upper end face 104e of the rotating-body-side encircling member 104 and an opposing face 108c of the hub-side encircling member 108 facing the end face 104e in the direction of the rotation axis R forms a passage A of the lubricant 92.

The cap 12 is an annular member which is fixed to the top face of the hub 28 so as to cover the second air-liquid interface 116 and the hub-side encircling member 108 and which has a cross section of a reversed L-shape.

Figure 3:
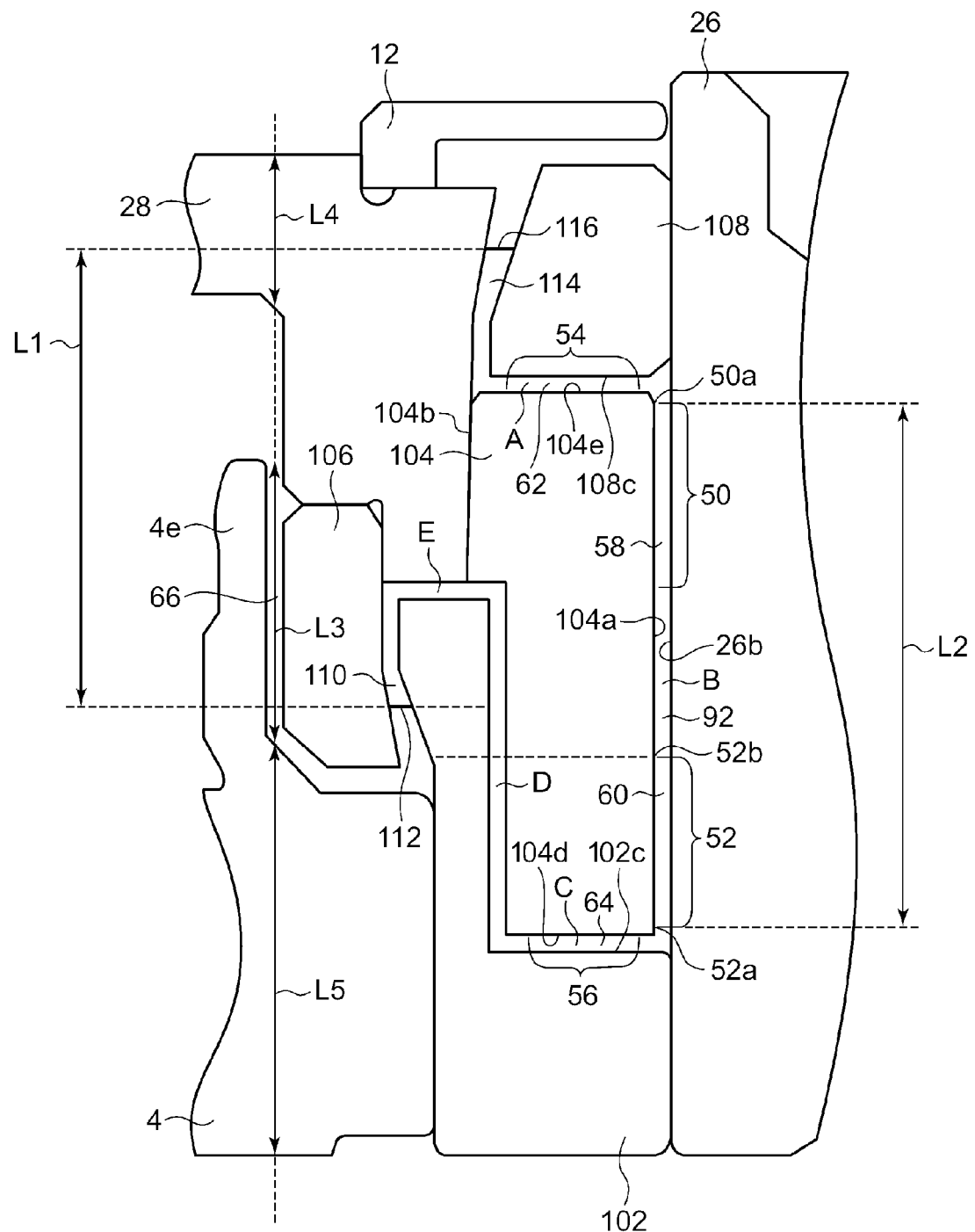
FIG. 3 is an enlarged cross-sectional view showing the periphery of a passage of a lubricant in an enlarged manner from FIG. 2.

FIG. 3 is an enlarged cross-sectional view showing the periphery of the passage of the lubricant 92 in an enlarged manner from FIG. 2. Formed in the inner periphery 104a of the rotating-body-side encircling member 104 is a pair of first radial dynamic pressure generating groove 52 and second radial dynamic pressure generating groove 50 which are distant from each other in the direction of the rotation axis R and which are in a herringbone shape. The second radial dynamic pressure generating groove 50 is formed above the first radial dynamic pressure generating groove 52. At least one of the second radial dynamic pressure generating groove 50 and the first radial dynamic pressure generating groove 52 may be formed in the side face 26b of the shaft 26 instead of the inner periphery 104a of the rotating-body-side encircling member 104.

The passage B of the lubricant 92 includes a first gap 58 between a portion where the second radial dynamic pressure generating groove 50 is formed in the inner periphery 104a of the rotating-body encircling member 104 and the side face 26b of the shaft 26, and a second gap 60 between a portion where the first radial dynamic pressure generating groove 52 is formed in the inner periphery 104a of the rotating-body-side encircling member 104 and the side face 26b of the shaft 26.

When the rotating body rotates relative to the fixed body, the second radial dynamic pressure generating groove 50 and the first radial dynamic pressure generating groove 52 generate dynamic pressures to the lubricant 92 in the first gap 58 and the second gap 60, respectively. Such dynamic pressures support the rotating body in the radial direction in a non-contact condition with the fixed body.

A first thrust dynamic pressure generating groove 54 in a herringbone or spiral shape is formed in the upper end face 104e of the rotating-body-side encircling member 104. The first thrust dynamic pressure generating groove 54 may be formed in the opposing face 108c of the hub-side encircling member 108 instead of the upper end face 104e of the rotating-body-side encircling member 104.

A second thrust dynamic pressure generating groove 56 in a herringbone or spiral shape is formed in the bottom end face 104d of the rotating-body-side encircling member 104. The second thrust dynamic pressure generating groove 56 may be formed in the opposing face 102c of the base-side encircling member 102 instead of the bottom end face 104d of the rotating-body-side encircling member 104.

The passage A of the lubricant 92 includes a third gap 62 between a portion where the first thrust dynamic pressure generating groove 54 is formed in the upper end face 104e of the rotating-body-side encircling member 104 and the opposing face 108c of the hub-side encircling member 108.

The passage C of the lubricant 92 includes a fourth gap 64 between a portion where the second thrust dynamic pressure generating groove 56 is formed in the bottom end face 104d of the rotating-body-side encircling member 104 and the opposing face 102c of the base-side encircling member 102.

When the rotating body rotates relative to the fixed body, the first thrust dynamic pressure generating groove 54 and the second thrust dynamic pressure generating groove 56 generate dynamic pressures to the lubricant 92 in the third gap 62 and the fourth gap 64, respectively. Such dynamic pressures support the rotating body in the direction of the rotation axis R in a non-contact condition with the fixed body.

A distance L1 between the first air-liquid interface 112 of the lubricant 92 and the second air-liquid interface 116 thereof in the direction of the rotation axis R is shorter than a distance L2 from an end 50a of the second radial dynamic pressure generating groove 50 opposite to the first radial dynamic pressure generating groove 52 to an end 52a of the first radial dynamic pressure generating groove 52 opposite to the second radial dynamic pressure generating groove 50.

The lubricant 92 is continuously present from the first air-liquid interface 112 to the second air-liquid interface 116 through the passages E, D, C, B, and A, in this order. In view of the dynamic pressure generating groove, the lubricant 92 is continuously present from the first air-liquid interface 112 to the second air-liquid interface 116 through the second thrust dynamic pressure generating groove 56, the first radial dynamic pressure generating groove 52, the second radial dynamic pressure generating groove 50, and the first thrust dynamic pressure generating groove 54 in this order.

The first air-liquid interface 112 is located at the second-radial-dynamic-pressure-generating-groove-50 side over an end 52b of the first radial dynamic pressure generating groove 52 at the second-radial-dynamic-pressure-generating-groove-50 side in the direction of the rotation axis R. In particular, the first air-liquid interface 112 is located between the second radial dynamic pressure generating groove 50 and the first radial dynamic pressure generating groove 52 in the direction of the rotation axis R.

Next, an explanation will be given of an operation of the rotating device 100 employing the above-explained configuration. A drive current with three phases is supplied to the coil 42 in order to rotate the magnetic recording disk 8. The drive current flowing through the coil 42 generates magnetic fluxes along the twelve protrusions. The magnetic fluxes provide torque to the cylindrical magnet 32, and thus the rotating body and the magnetic recording disk 8 mounted thereon start rotating. Simultaneously, the voice coil motor 16 causes the swing arm 14 to swing, and thus the recording/playing head moves in and out within the swing range over the magnetic recording disk 8. The recording/playing head converts magnetic data recorded in the magnetic recording disk 8 into electronic signals, transmits such signals to an unillustrated control substrate, and writes data transmitted from the control substrate as electronic signals in the magnetic recording disk 8.

According to the rotating device 100 of the present embodiment, the distance L1 is shorter than the distance L2. Hence, the first air-liquid interface 112 and the second air-liquid interface 116 can be designed to become close to each other in the direction of the rotation axis R. This reduces the leak-out of the lubricant 92 due to gravity acting on the lubricant 92 and a difference in pressure between the first air-liquid interface 112 and the second air-liquid interface 116. Moreover, the second radial dynamic pressure generating groove 50 and the first radial dynamic pressure generating groove 52 can be distant from each other in the direction of the rotation axis R. Accordingly, the rigidity of the bearing can be improved.

Moreover, according to the rotating device 100 of the present embodiment, the passage of the lubricant 92 is turned back so as to expand in the radial direction, and the first air-liquid interface 112 is located at the second-radial-dynamic-pressure-generating-groove-50 side of the first radial dynamic pressure generating groove 52 beyond the end 52b at the second-dynamic-pressure-generating-groove-50 side in the direction of the rotation axis R. This enables reduction of the thickness of the rotating device 100 in comparison with a case in which one air-liquid interface, a radial dynamic pressure generating groove, and another air-liquid interface are arranged in this order along the direction of the rotation axis R.

Furthermore, according to the rotating device 100 of the present embodiment, when the passage of the lubricant 92 is turned back in the radial direction, portions where the rotating body and the fixed body face with each other in the direction of the rotation axis R, e.g., portions corresponding to the passage A of the lubricant 92 and the passage C thereof are spontaneously created. The rotating device 100 of the present embodiment has thrust dynamic pressure generating grooves at such portions.

Regarding the joined portion between the shaft and the base in a shaft-fixed type rotating device, it is desirable to fix the shaft by bonding in such a way that the perpendicularity of the shaft to the base is adjustable. When, however, the diameter of the shaft is small, sufficient joining strength cannot be obtained in some cases by bonding.

According to the rotating device 100 of the present embodiment, the shaft 26 is interference fitted to the inner periphery of the base-side encircling member 102, and the outer periphery is bonded to the base 4. Hence, when the outer periphery of the base-side encircling member 102 is bonded to the base 4, it is possible to let the adhesive cured while maintaining the perpendicularity of the shaft 26 to the base 4 appropriately. From the standpoint of the strength, since the shaft 26 and the base-side encircling member 102 are joined together by interference fitting, the joining strength thereof is sufficient, while at the same time, since the diameter of the outer periphery of the base-side encircling member 102 is large in comparison with the diameter of the shaft 26, the joining strength by bonding between the base-side encircling member 102 and the base 4 is also sufficient.

According to the rotating device 100 of the present embodiment, the labyrinth seal 66 is provided in a shape along the direction of the rotation axis R. The hub 28 and the base 4 are present above and below the labyrinth seal 66, respectively. With reference to FIG. 3, when the thickness of the rotating device 100 is restricted, a total value (L3+L4+L5) of a length L3 of the labyrinth seal 66 in the direction of the rotation axis R, a thickness L4 of the portion of the hub 28 facing the labyrinth seal 66 in the direction of the rotation axis R, and a thickness L5 of the portion of the base 4 facing the labyrinth seal 66 in the direction of the rotation axis R is restricted by the limited thickness of the rotating device 100.

The rotating device 100 of the present embodiment has the length L3 of the labyrinth seal 66 set to be 1.93 mm in the direction of the rotation axis R, the thickness L4 of the portion of the hub 28 to be equal to or larger than 1.13 mm facing the labyrinth seal 66 in the direction of the rotation axis R. In this case, the labyrinth seal 66 can further suppress a vaporization of the lubricant 92. Moreover, the thickness L5 of the portion of the base 4 is set to be 3.07 mm facing the labyrinth seal 66 in the direction of the rotation axis R, and is larger than the length L3 of the labyrinth seal 66 in the direction of the rotation axis R which is 1.93 mm. In this case, a deformation of the base 4 near the through hole 4h due to vibration and shock can be further suppressed, and thus a small gap for the labyrinth seal 66 can be designed.

The explanation was given of the configuration and the operation of the rotating device 100 according to the first embodiment. The above-explained embodiment is merely for exemplification, and it should be understood by those skilled in the art that various modifications to the combination of respective structural elements are possible and such modifications are within the scope and spirit of the present invention.

<First Modified Example of First Embodiment>

In manufacturing of the rotating device 100, the rotating-body-side encircling member may wobble relative to the hub. In order to prevent the rotating-body-side encircling member from wobbling relative to the hub, facilities may be devised or an employment of a skilled worker may be necessary. However, devising of the facilities needs a cost and is often difficult. Moreover, it is not always true that the skilled worker is placed in the manufacturing line. Hence, in this case, the hub and the rotating-body-side encircling member are devised in order to employ a configuration in which the hub and the rotating-body-side encircling member easily become coaxial to each other.

Figure 4A:
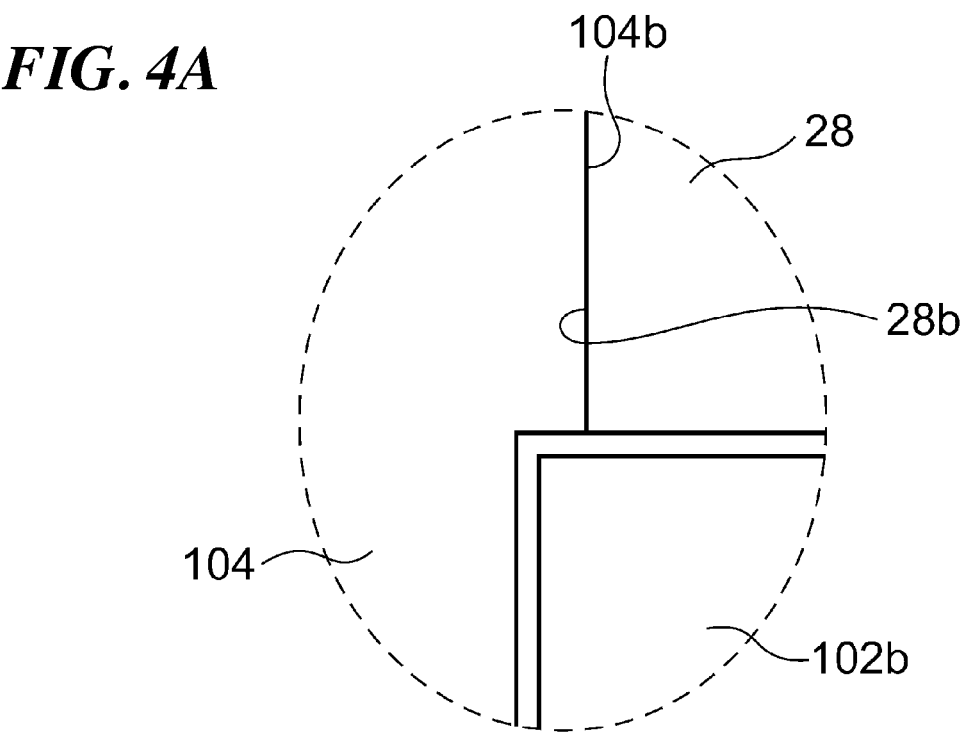
FIG. 4A is an enlarged cross-sectional view showing a cross section of a joined portion of a rotating-body-side encircling member and a hub in an enlarged manner according to the first embodiment.
Figure 4B:
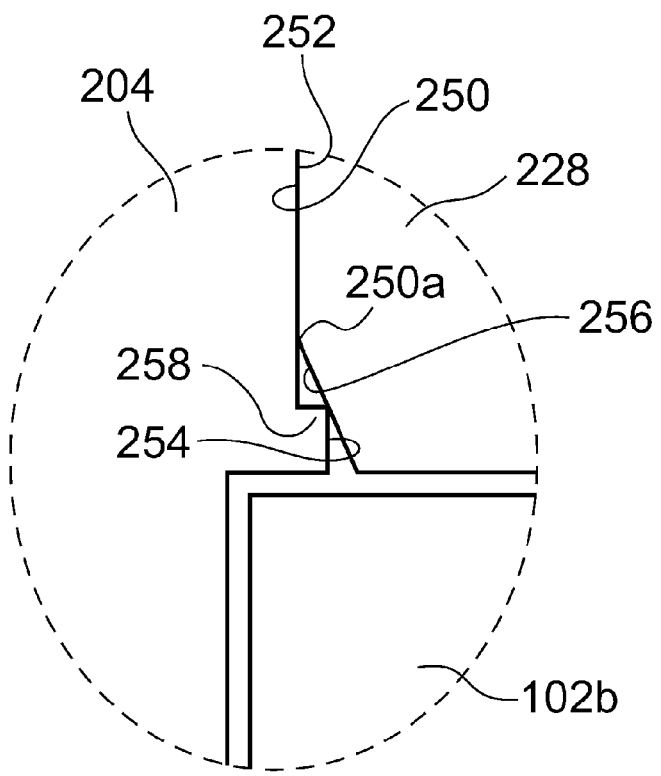
FIG. 4B is an enlarged cross-sectional view showing a cross section of a joined portion of a rotating-body-side encircling member and a hub in an enlarged manner according to a first modified example of the first embodiment.

FIGS. 4A and 4B are enlarged cross-sectional views showing a cross section of a joined part of the rotating-body-side encircling member and the hub according to the first embodiment and a first modified example thereof, respectively. FIG. 4A is an enlarged cross-sectional view showing an area surrounded by a dashed circle in FIG. 2 in an enlarged manner. FIG. 4B is an enlarged cross-sectional view showing a part corresponding to FIG. 4A of a rotating device according to the first modified example. According to the rotating device of the first modified example, a surface at the hub-228 side in the surface where a rotating-body-side encircling member 204 and a hub 228 are joined together includes a cylindrical first periphery 250 and a diameter-increasing surface 256 increasing the diameter from a lower peripheral end 250a of the first periphery 250 toward the bottom. A surface at the rotating-body-side-encircling-member-204 side in the surface where the rotating-side-encircling member 204 and the hub 228 are joined together includes a cylindrical second periphery 252 and a third periphery 254 which is formed below the second periphery 252 and which has a larger diameter than that of the second periphery 252. The first periphery 250 and the second periphery 252 abut with each other, and are in particular bonded together. A step 258 formed between the second periphery 252 and the third periphery 254 abuts the diameter-increasing surface 256. That is, the step 258 is in line contact with the diameter-increasing surface 256.

In this case, when the rotating-body-side encircling member 204 is bonded to the hub 228, the step 258 abuts the diameter-increasing surface 256. Accordingly, the tilting of the rotating-body-side encircling member 204 relative to the hub 228 is suppressed, and the coaxiality of the hub 228 and the rotating-body-side encircling member 204 can be ensured.

It is also appropriate if the second periphery and the third periphery are provided in a surface at the hub side in the surface where the rotating-body-side encircling member and the hub are joined together, and the first periphery and the diameter-increasing surface are provided in a surface at the rotating-body-side-encircling-member side in the surface where the rotating-body-side encircling member and the hub are joined together.

According to the above-explained embodiment, the hub 28 and the rotating-body-side encircling member 104 are first separately formed and joined together later, but the present invention is not limited to this configuration. For example, the hub 28 and the rotating-body-side encircling member 104 may be integrally formed together. In this case, an outer periphery 28g of the hub 28 and an inner periphery 104a of the rotating-body-side encircling member 104 may be successively cut and machined. Inconsistency of the center of the outer periphery 28g of the hub 28 and that of the inner periphery 104a of the rotating-body-side encircling member 104 can be easily suppressed.

In the above-explained embodiment, the explanation was given of the case in which the first air-liquid interface 112 and the second air-liquid interface 116 do not overlap in the radial direction, but the present invention is not limited to this configuration. For example, one air-liquid interface may be provided so as to at least partially overlap another air-liquid interface. In this case, respective positions in the radial direction of the two air-liquid interfaces when inverted upside down become substantially same. Hence, a needle can be commonly used when a lubricant is filled in the gap spaces forming respective air-liquid interfaces, and the lubricant can be filled in the two gap spaces by inverting the rotating device upside down with the needle being substantially still. That is, the lubricant can be appropriately filled in the gap spaces forming the two air-liquid interfaces using only one needle.

According to the above-explained embodiment, the explanation was given of the case in which no communicating passage for letting the first capillary seal 110 and the second capillary seal 114 communicated with each other is provided, but the present invention is not limited to this configuration. For example, a communicating passage for letting the first capillary seal 110 and the second capillary seal 114 communicated with each other may be provided without through both of the second radial dynamic pressure generating groove 50 and the first radial dynamic pressure generating groove 52. Moreover, a communicating passage for letting the first capillary seal 110 and the second capillary seal 114 communicated with each other linearly may be provided. For example, with reference to FIG. 3, a groove along the axial direction may be provided in the first outer periphery 104b of the rotating-body-side encircling member 104 abutting the hub 28 in order to form a communicating passage. Since a difference in pressure between the first capillary seal 110 and the second capillary seal 114 becomes small, the leak-out of the lubricant 92 can be suppressed.

<Second Modified Example of First Embodiment>

Figure 5:
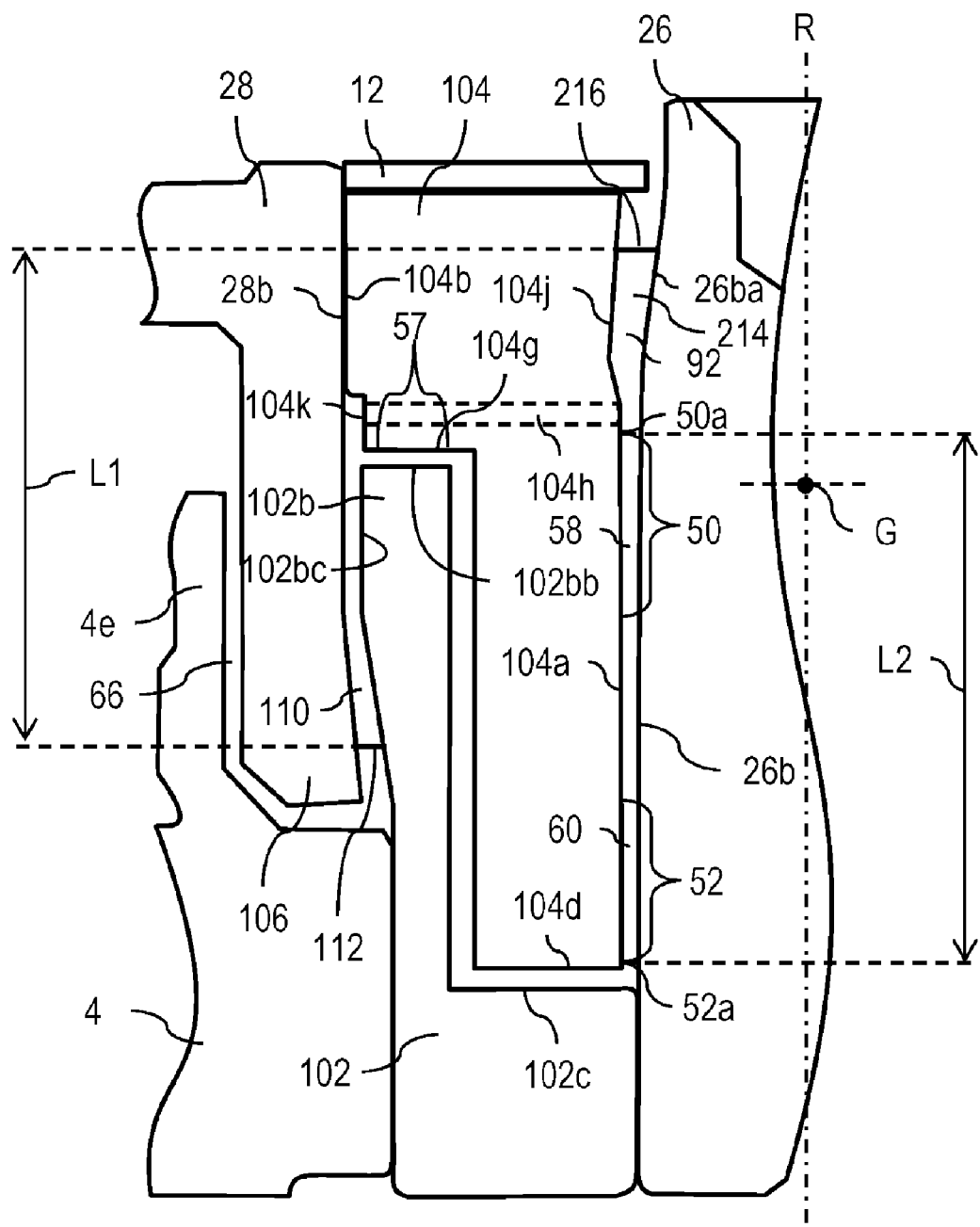
FIG. 5 is an enlarged cross-sectional view showing the periphery of a passage of a lubricant of a rotating device in an enlarged manner according to a second modified example of the first embodiment.
Figure 6:
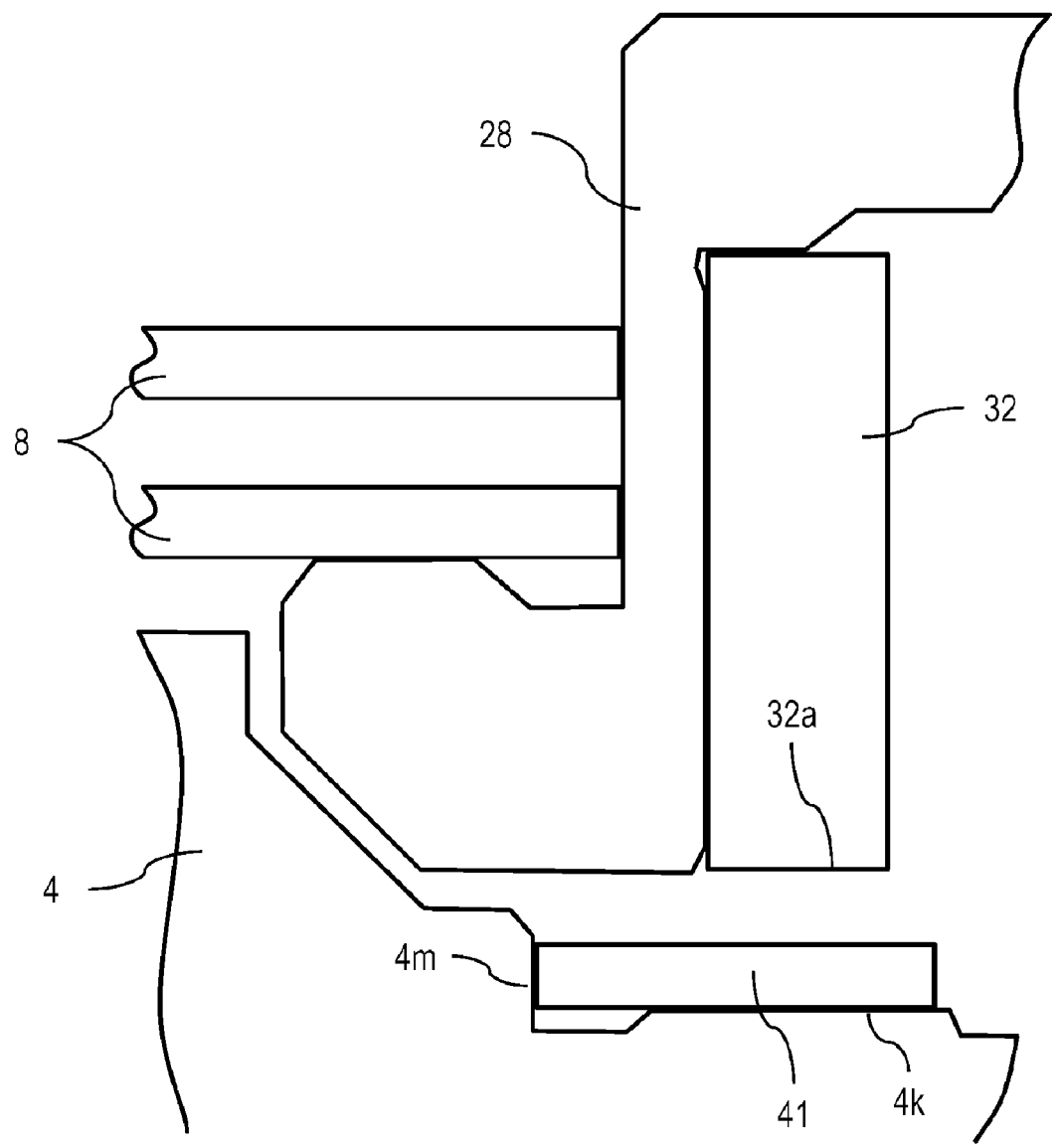
FIG. 6 is an enlarged cross-sectional view showing the periphery of a cylindrical magnet of the rotating device in an enlarged manner according to the second modified example.

Next, an explanation will be given of a second modified example of the first embodiment with reference to FIGS. 5 and 6. Depending on the application of the rotating device 100, it is necessary to suppress a leak-out of the lubricant 92 at a higher level. Moreover, a precision for the position of the rotating body is required in some cases. In order to apply the rotating device in such an application, a following configuration that modifies the above-explained configuration can be employed. FIG. 5 is an enlarged cross-sectional view showing the periphery of the air-liquid interface of the lubricant in an enlarged manner according to a second modified example. FIG. 5 shows a cross section leftward from the rotation axis R, and the right cross section is symmetrical with the left cross section. FIG. 6 is an enlarged cross-sectional view showing the periphery of a cylindrical magnet 32 in an enlarged manner according to the second modified example. The second modified example employs the same configuration as that of FIG. 2 other than the portions shown in FIGS. 5 and 6.

In the above explanation, the explanation was given of the case in which the second air-liquid interface 116 of the lubricant 92 contacts the outer periphery of the hub-side encircling member 108. According to the second modified example, a second air-liquid interface 216 of the lubricant 92 contacts the inner periphery of the rotating-body-side encircling member 104 and the outer periphery of the shaft 26. The second modified example includes no hub-side encircling member 108. This results in the reduction of the number of the parts, thereby reducing the work and effort for assembling. Moreover, the accumulation of dimension errors at the time of assembling of the parts can be reduced.

According to the second modified example shown in FIG. 5, the first outer periphery 104b of the rotating-body-side encircling member 104 contacting the hub 28 slightly protrudes outwardly of the radial direction from an outer periphery 102bc of the cylinder part 102b of the base-side encircling member 102. In other words, the diameter of the first outer periphery 104b is larger than that of the outer periphery 102bc. The rotating-body-side encircling member 104 has the first outer periphery 104b fixed to the center opening 28b of the hub 28 by both press fitting and bonding.

The shaft 26 is formed with a shaft periphery 26ba that is a side face reducing a diameter toward the opposite direction to the base 4 in the axial direction. The shaft periphery 26ba is located above the area of the side face 26b where the second radial dynamic pressure generating groove 50 is provided. The rotating-body-side encircling member 104 is formed with a second inner periphery 104j that is a side face reducing a diameter toward the opposite direction to the base 4 in the axial direction. The second inner periphery 104j is located at a portion near the upper end of the rotating-body-side encircling member 104. The second inner periphery 104j is located so as to encircle and partially overlap the shaft periphery 26ba. An inclined angle of the shaft periphery 26ba relative to the rotation axis R is larger than an inclined angle of the second inner periphery 104j relative to the rotation axis R. The gap between the second inner periphery 104j and the shaft periphery 26ba gradually becomes wide toward the upper part along the rotation axis R. The gap between the second inner periphery 104j and the shaft periphery 26ba forms a capillary seal 214. One air-liquid interface 216 of the lubricant 92 is located between the shaft periphery 26ba and the second inner periphery 104j. That is, the air-liquid interface 216 contacts the second inner periphery 104j and the shaft periphery 26ba. An unillustrated oil-repelling agent is applied to the upper end of the second inner periphery 104*j* and that of the shaft periphery 26*ba*, thereby reducing the leak-out of the lubricant 92.

The rotating-body-side encircling member 104 is provided with a pathway 104*h* for letting the lubricant 92 contacting the inner periphery side of the rotating-body-side encircling member 104 and the lubricant 92 contacting the outer periphery side thereof communicated with each other. The pathway 104*h* is provided so as to pass all the way through the rotating-body-side encircling member 104 from the inner periphery 104*a* to the outer periphery 104*k*. The pathway 104*h* is located so as to communicate a space between the first capillary seal 110 and the second capillary seal 214. More specifically, the pathway 104*h* is located between the second inner periphery 104*j* and the first gap 58 in the direction of the rotation axis R. The pathway 104*h* reduces a difference in pressure between the first capillary seal 110 and the second capillary seal 214, thereby suppressing the leak-out of the lubricant 92.

A single pathway 104*h* is provided but a plurality of pathways 104*h* may be provided in the circumferential direction. The distribution of radial dynamic pressures in the circumferential direction becomes non-uniform due to the pathway 104*h*. Hence, it is appropriate if a plurality of pathways 104*h* are arranged in the circumferential direction at an equal interval. This suppresses the non-uniformity of the distribution of radial dynamic pressures in the circumferential direction. According to the second modified example, two pathways 104*h* are provided in symmetrical locations with reference to the rotation axis R.

A distance L1 between the first air-liquid interface 112 of the lubricant 92 and the second air-liquid interface 216 thereof in the direction of the rotation axis R is shorter than a distance L2 from the end 50*a* of the second radial dynamic pressure generating groove 50 opposite to the first radial dynamic pressure generating groove 52 to the end 52*a* of the first radial dynamic pressure generating groove 52 opposite to the second radial dynamic pressure generating groove 50.

A dynamic pressure generating groove that generates dynamic pressure in the thrust direction can be formed in either one of the bottom end face 104*d* of the rotating-body-side encircling member 104 and the opposing face 102*c* of the base-side encircling member 102. Moreover, another groove that generates dynamic pressure in the thrust direction can be formed in either one of the end face 102*bb* of the cylinder part 102*b* and a rotating-body-side opposing face 104*g* of the rotating-body-side encircling member 104 facing the end face 102*bb* in the axial direction. The dynamic pressure generating groove that generates dynamic pressure in the thrust direction can be formed in a herringbone shape or a spiral shape. In the case of the second modified example shown in FIG. 5, a third dynamic pressure generating groove 57 is formed in the rotating-body-side opposing face 104*g* in a spiral shape. In FIG. 5, a letter G denotes the center of gravity of the rotating body when the magnetic recording disk 8 is mounted thereon. The position of the rotating-body-side opposing face 104*g* in the direction of the rotation axis R is formed above the gravity center G. As a result, the rotating body is supported circumferentially by an area above the gravity center G, and thus the rotating body is not likely to tilt.

FIG. 6 is an enlarged cross-sectional view showing the periphery of the cylindrical magnet 32 of the rotating device in an enlarged manner according to the second modified example. According to the second modified example, a suction plate 41 is fastened near a bottom end face 32*a* of the cylindrical magnet 32 and on the top face of the base 4. The other portions are same as those shown in FIG. 2. The suction plate 41 may be fastened by, for example, bonding. The outer periphery surface of the suction plate 41 faces a side face 4*m* of the step of the base 4 in the radial direction. The bottom end face of the suction plate 41 is mounted on a plate mounting part 4*k* of the base 4. The suction plate 41 is formed of a tabular member of a magnetic material like an iron and in a ring shape.

The third dynamic pressure generating groove 57 generates dynamic pressure to the lubricant 92 in a pump-in direction, and upward force to the rotating body is produced. Moreover, the suction plate 41 magnetically suctions the cylindrical magnet 32. As a result, downward force to the rotating body including the cylindrical magnet 32 is also produced. The rotating body is stabilized at a position where the upward force is balanced with the downward force and the gravitational force acting on the rotating body. That is, in the direction along the rotation axis R, the position of the rotating body with reference to the fixed body can be defined by setting the downward force in accordance with the upward force and the gravitational force acting on the rotating body.

Next, an explanation will be given of the external-side encircling member 106. In the case of the example shown in FIG. 3, the explanation was given of the external-side encircling member 106 which is formed separately from the hub 28 and which is fixed thereto later, but the present invention is not limited to this configuration. According to the second modified example shown in FIG. 5, the external-side encircling member 106 is formed integrally with the hub 28. A high dimension accuracy can be easily obtained for the inner periphery of the external-side encircling member 106, and it is also preferable from the standpoint of less assembling work and effort.

According to the second modified example shown in FIG. 5, the cap 12 is provided so as to cover at least a part of the second air-liquid interface 216 and the upper end of the rotating-body-side encircling member 104. The side face of the outer circumference of the cap 12 contacts the side face of the center opening 28*b* of the hub 28. The bottom end face of the cap 12 contacts the upper end face of the rotating-body-side encircling member 104. The cap 12 is an annular member in a substantially disc shape. It is preferable since a high dimension accuracy can be obtained.

According to the above-explained embodiment, the explanation was given of the case in which the base-side encircling member 102 is directly attached to the base 4, but the present invention is not limited to this configuration. For example, a brushless motor including a rotating body and a fixed body may be separately formed and such a brushless motor may be attached to a chassis.

Second Embodiment

Depending on the specification of a product using the rotating device, it is desirable to reduce the cost of the whole product while accomplishing the above-explained object. Filling of a lubricant is a requisite process in manufacturing of the rotating device, but if such a requisite process can be simplified, the cost of the rotating device can be reduced, thereby reducing the cost of the whole product. An explanation below will be given in detail of a rotating device of a second embodiment which employs a configuration appropriate for such an application with reference to the accompanying drawings.

Like the first embodiment, a rotating device of the second embodiment is also a shaft-fixed type disk drive device. The same structural element as that of the first embodiment will be denoted by the same reference numeral, and the detailed explanation thereof will be omitted for clarity. The explanation below will be mainly given of the different part from the first embodiment.

Figure 7:
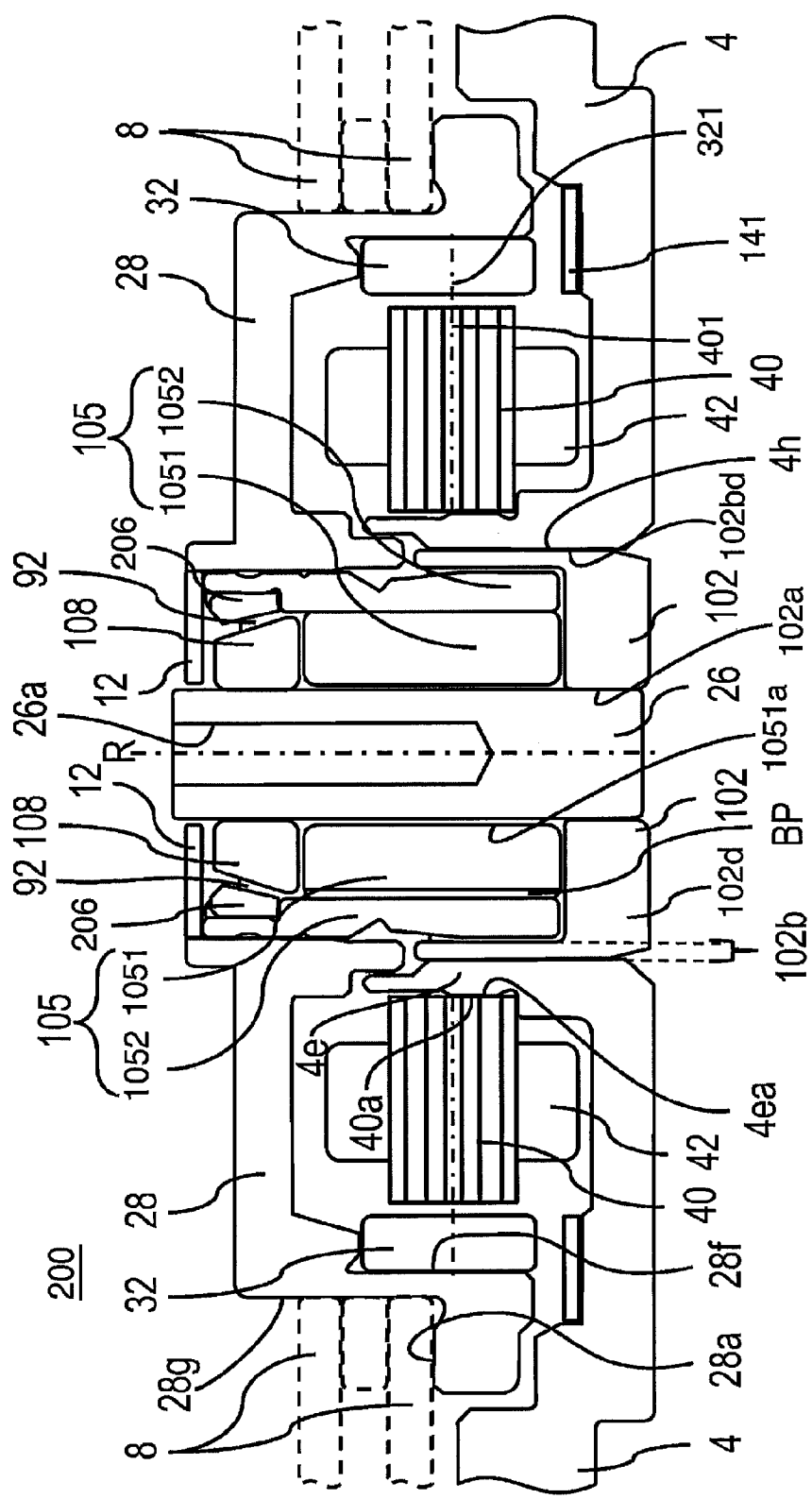
FIG. 7 is a diagram showing a rotating device according to a second embodiment of the present invention.

FIG. 7 is a cross-sectional view showing a rotating device 200 of the second embodiment. A rotating body includes a hub 28, a cylindrical magnet 32, a rotating-body-side encircling member 105, an external-side encircling member 206, and a cap 12. A fixed body includes a base 4, a stacked core 40, a coil 42, a base-side encircling member 102, a shaft 26, and a hub-side encircling member 108. A lubricant 92 is continuously present partially in a space between the rotating body and the fixed body.

According to the rotating device 200 of the present embodiment, a first magnetic center 321 that is a center of the driving magnetization by the cylindrical magnet 32 in the direction of the rotation axis R is located so as to be substantially consistent with a second magnetic center 401 that is a center of the stacked core 40 in the direction of the rotation axis R. It is preferable since noises at the time of rotation due to the driving magnetization by the cylindrical magnet 32 and the stacked core 40 can be suppressed. The first magnetic center 321 may be located above the second magnetic center 401 and distant therefrom. This enables an increase of the dimension of the cylindrical magnet 32 in the axial direction, and thus driving torque generated by the cylindrical magnet 32 increases.

In a condition in which the hub 28 is downwardly directed to the base 4, the hub 28 may be descended by gravitational force but may be too distant from the base 4 during a rotation, which disturbs a normal rotation. In order to address this problem, a suction plate 141 is bonded and fixed to the base 4 at a location facing the bottom end of the cylindrical magnet 32. The suction plate 141 is formed of a material mainly containing, for example, iron and having a soft magnetic property. The suction plate 141 produces magnetic suction force to the magnet 32. The suction plate 141 is formed in a substantially ring shape, and the diameter of the inner circumference of such a ring shape may be larger than the diameter of the inner circumference of the cylindrical magnet 32. This increases the ratio of magnetic fluxes received by the stacked core 40 among magnetic fluxes generated by the cylindrical magnet 32.

The rotating-body-side encircling member 105 is cylindrical which encircles the shaft 26. An inner cylinder 1051 which has an inner periphery encircling the shaft 26 and an outer cylinder 1052 which encircles the inner cylinder 1051 are formed separately, and bonded and fixed together in order to form the rotating-body-side encircling member 105. The inner cylinder 1051 has an inner periphery 1051a provided with a radial dynamic pressure generating groove to be discussed later. A communicating passage BP that is a groove along the direction of the rotation axis R is provided in the outer periphery of the inner cylinder 1051. The communicating passage BP is filled with a lubricant 92, and lets a passage A' and a passage C' to be discussed later communicated with each other. The communicating passage BP reduces a difference in pressure between the passage A' and the passage C', thereby suppressing a leak-out of the lubricant 92 from the air-liquid interface. The communicating passage BP may be provided as a groove along the axial direction in the inner periphery of the outer cylinder 1052.

The base 4 is provided with a through hole 4h around the rotation axis R of the rotating body. The base-side encircling member 102 includes a disk part 102d that encircles the base-4 side of the shaft 26 and a cylinder part 102b that encircles the rotating-body-side encircling member 105. That is, the base-side encircling member 102 has a substantially L-shaped cross section. An outer periphery 102bd of the cylinder part 102b is bonded and fixed to the through hole 4h. The base-side encircling member 102 has a shaft opening 102a around the rotation axis R of the rotating body, and the bottom end of the shaft 26 is fitted in the shaft opening 102a.

The base 4 includes a cylindrical protrusion 4e around the rotation axis R of the rotating body. The protrusion 4e protrudes from the top face of the base 4 so as to encircle the cylinder part 102b. A center opening 40a of the annular part of the stacked core 40 is fitted with an outer periphery 4ea of the protrusion 4e, and thus the stacked core 40 is fixed to the base 4. The annular part of the stacked core 40 is bonded and fixed to the protrusion 4e by, in particular, press fitting or loose fitting.

Figure 8:
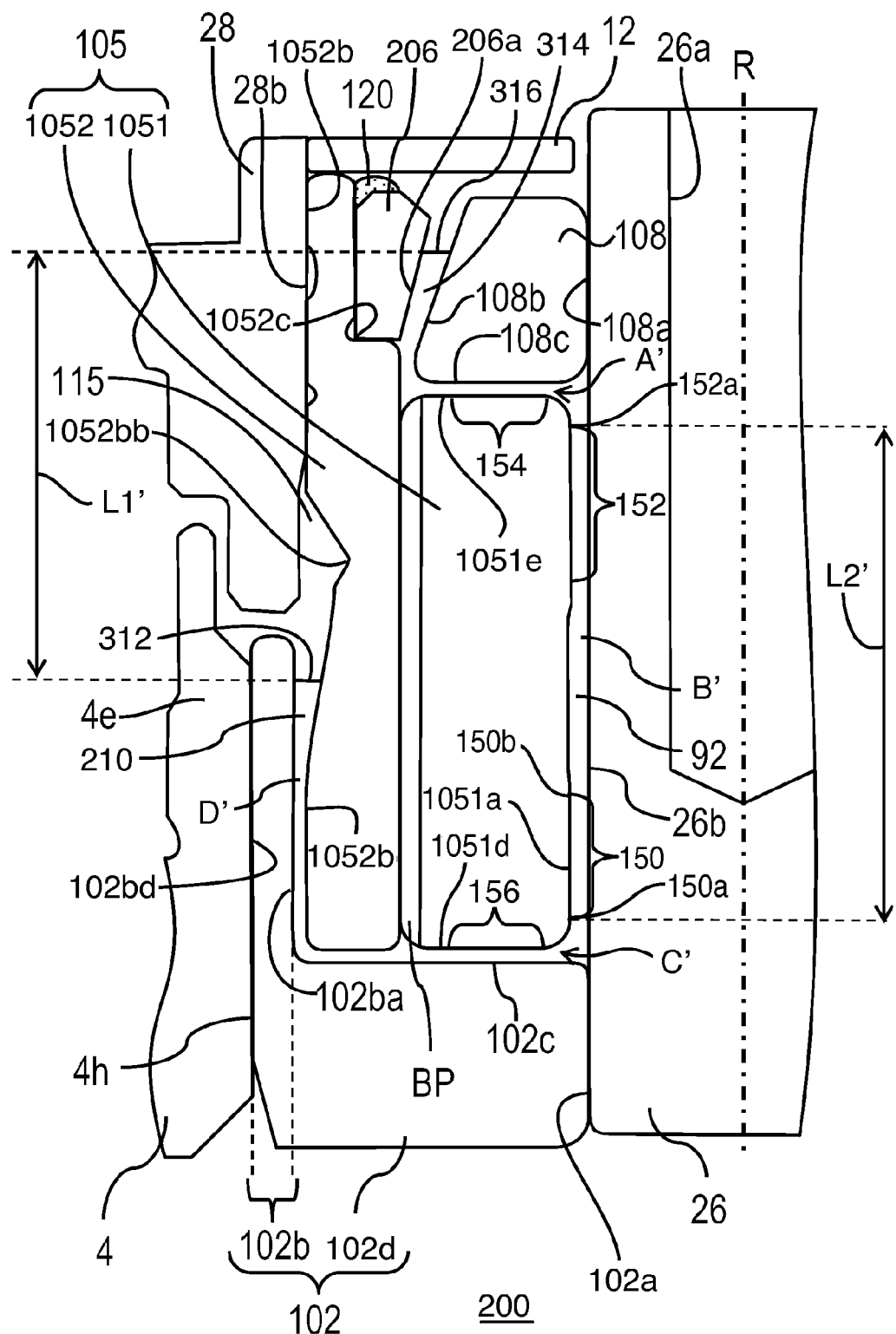
FIG. 8 is an enlarged cross-sectional view showing the periphery of a passage of a lubricant from FIG. 7 in an enlarged manner.

FIG. 8 is an enlarged cross-sectional view showing the periphery of a passage of the lubricant 92 in FIG. 7 in an enlarged manner. The outer cylinder 1052 has an encircling recess 1052bb provided at the middle part of an outer periphery 1052b in the direction of the rotation axis R and recessed inwardly in the radial direction. The outer periphery 1052b of the outer cylinder 1052 is fitted into a hub opening 28b of the hub 28, and thus the outer cylinder 1052 is fixed to the hub 28. The hub-28 side of the outer periphery 1052b of the outer cylinder 1052 is bonded to the hub opening 28b of the hub 28. A circumferential groove is formed in the part of the outer periphery 1052b fixed to the hub opening 28b. A passage D' of the lubricant 92 formed as a gap between the outer periphery 1052b and the base-side encircling member 102 overlaps a passage B' of the lubricant 92 formed as a gap between the inner periphery 104a and a side face 26b of the shaft 26 in the direction of the rotation axis R.

The shaft 26 has a bottom end fixed to the disk part 102d of the base-side encircling member 102 by, in particular, interference fitting. Such an interference fitting can be realized by, for example, pressing the shaft 26 into the shaft opening 102a, shrink fitting, or inserting the shaft 26 cooled by a liquid nitrogen in the shaft opening 102a and then letting the shaft 16 to be a normal temperature. It is appropriate if bonding is applied together with the interference fitting.

The base-side encircling member 102 has a portion where the cylinder part 102b contacts the through hole 4h larger than a portion where the disk part 102d contacts the shaft 26 in the axial direction.

The cylinder part 102b may be separately formed from the disk part 102d and joined together later. When the cylinder part 102b and the disk part 102d are formed integrally with each other like the present embodiment, the number of parts can be reduced. A gap between the inner periphery 102ba of the cylinder part 102b and the outer periphery 1052b of the outer cylinder 1052 forms a passage D' of the lubricant 92. A gap between a first thrust surface 1051d that is a bottom end face of the inner cylinder 1051 and a first opposing face 102c of the base-side encircling member 102 facing such a thrust surface in the direction of the rotation axis R forms a passage C' of the lubricant 92. The first opposing face 102c is provided on the disk part 102d.

A first capillary seal 210 is formed where a gap between the inner periphery 102ba of the cylinder part 102b and the outer periphery 1052b of the outer cylinder 1052 gradually becomes widespread upwardly. The first capillary seal 210 has a first air-liquid interface 312 of the lubricant 92, and prevents the lubricant 92 from leaking out by a capillary phenomenon. The first air-liquid interface 312 of the lubricant 92 contacts the inner periphery 102ba of the cylinder part 102b and the outer periphery 1052b of the outer cylinder 1052. In order to further suppress a leak-out of the lubricant 92, the first capillary seal 210 may have an area where an oil-repelling agent is applied around the outlet of such a seal.

When, for example, the rotating device receives shock, the lubricant 92 may spill out from the first air-liquid interface 312. In order to address this problem, a reservoir 115 is provided which is a pouched space having an opening at a location facing the first air-liquid interface 312 in the direction of the rotation axis R. The lubricant 92 spilled out from the first air-liquid interface 312 is caught in the reservoir 115, thereby suppressing a leak to the exterior. The reservoir 115 is formed between the hub 28 and the outer cylinder 1052. More specifically, the reservoir 115 is formed in a space between the hub opening 28b and the outer periphery 1052b. An oil-repelling agent may be applied to the reservoir 115. This further suppresses a leak-out of the lubricant 92. The reservoir 115 may be provided at a portion where the gap between the hub opening 28b and the encircling recess 1052bb gradually becomes widespread downwardly. The concavity of the encircling recess 1052bb increases the spatial volume of the reservoir 115, which can suppress a leak to the exterior when a large amount of the lubricant 92 spills out.

The external-side encircling member 206 is cylindrical which encircles the hub-side encircling member 108 and which is fixed to the outer cylinder 1052. The external-side encircling member 206 is bonded and fixed to a step 1053c provided above the inner periphery of the outer cylinder 1052. An adhesive 120 is applied across the external-side encircling member 206 and the outer cylinder 1052. The external-side encircling member 206 may be fixed by other conventionally well-known techniques like press fitting. Formed between the external-side encircling member 206 and the hub-side encircling member 108 is a second capillary seal 314 that is a portion where a gap between an inner periphery 206a of the external-side encircling member 206 and an outer periphery 108b of the hub-side encircling member 108 gradually becomes widespread upwardly. The second capillary seal 314 has a second air-liquid interface 316 of the lubricant 92, and suppresses a leak-out of the lubricant 92 by a capillary phenomenon. The second air-liquid interface 316 of the lubricant 92 contacts the inner periphery 206a of the external-side encircling member 206 and the outer periphery 108b of the hub-side encircling member 108. In order to further suppress a leak-out of the lubricant 92, the second capillary seal 314 may have an area where an oil-repelling agent is applied around the outlet of such a seal.

A gap between an upper second thrust surface 1051e of the inner cylinder 1051 and the second opposing face 108c of the hub-side encircling member 108 facing such a thrust surface in the direction of the rotation axis R forms a passage A' of the lubricant 92. The second opposing face 108c is provided on the hub-side encircling member 108.

The cap 12 is an annular member in a disk shape, and has an outer periphery fixed to the hub opening 28b of the hub 28. The cap 12 is provided so as to cover the second air-liquid interface 316 and the hub-side encircling member 108. The cap 12 has a bottom end face contacting the upper end face of the outer cylinder 1052.

A pair of herringbone first and second radial dynamic pressure generating grooves 150 and 152 are formed in the inner periphery 1051a of the inner cylinder 1051 so as to be distant from each other in the direction of the rotation axis R. The second radial dynamic pressure generating groove 152 is formed above the first radial dynamic pressure generating groove 150. At least either one of the first and second radial dynamic pressure generating grooves 150 and 152 may be formed in the side face 26b of the shaft 26 instead of the inner periphery 1051a.

A passage B' of the lubricant 92 includes a gap between a portion of the inner periphery 1051a of the inner cylinder 1051 where the first radial dynamic pressure generating groove 150 is formed and the side face 26b of the shaft 26, and a gap between a portion of the inner periphery 1051a of the rotating-body-side encircling member 105 (the inner cylinder 1051) where the second radial dynamic pressure generating groove 152 is formed and the side face 26b of the shaft 26.

When the rotating body rotates relative to the fixed body, the first radial dynamic pressure generating groove 150 and the second dynamic pressure generating groove 152 generate respective dynamic pressures to the lubricant 92 in respective gaps. Such dynamic pressures support the rotating body in the radial direction in a non-contact condition with the fixed body.

A herringbone or spiral first thrust dynamic pressure generating groove 156 is formed in the lower first thrust surface 1051d of the inner cylinder 1051. The first thrust dynamic pressure generating groove 156 may be formed in the first opposing face 102c of the base-side encircling member 102 instead of the first thrust surface 1051d.

A herringbone or spiral second thrust dynamic pressure generating groove 154 is formed in the upper second thrust surface 1051e of the inner cylinder 1051. The second thrust dynamic pressure generating groove 154 may be formed in the second opposing face 108c of the hub-side encircling member 108 instead of the second thrust surface 1051e.

The passage C' of the lubricant 92 includes a gap between a portion of the lower first thrust surface 1051d of the inner cylinder 1051 where the first thrust dynamic pressure generating groove 156 is formed and the first opposing face 102c of the base-side encircling member 102.

The passage A' of the lubricant 92 includes a gap between a portion of the upper second thrust surface 1051e of the inner cylinder 1051 where the second thrust dynamic pressure generating groove 154 is formed and the second opposing face 108c of the hub-side encircling member 108.

When the rotating body rotates relative to the fixed body, the second and first dynamic pressure generating grooves 154 and 156 generate respective dynamic pressures to the lubricant 92 in respective gaps. Such dynamic pressures support the rotating body in the direction of the rotation axis R in a non-contact condition with the fixed body.

A distance L1' between the first air-liquid interface 312 of the lubricant 92 and the second air-liquid interface 316 thereof in the direction of the rotation axis R is shorter than a distance L2' between an end 150a of the first radial dynamic pressure generating groove 150 opposite to the second radial dynamic pressure generating groove 152 and an end 152a of the second radial dynamic pressure generating groove 152 opposite to the first radial dynamic pressure generating groove 150.

The lubricant 92 is continuously present from the first air-liquid interface 312 to the second air-liquid interface 316 through the passages D', C', B', and A', in this order. In view of the dynamic pressure generating groove, the lubricant 92 is continuously present from the first air-liquid interface 312 to the second air-liquid interface 316 through the first thrust dynamic pressure generating groove 156, the first radial dynamic pressure generating groove 150, the second radial dynamic pressure generating groove 152, and the second thrust dynamic pressure generating groove 154 in this order.

The first air-liquid interface 312 is located at the second-radial-dynamic-pressure-generating-groove-152 side over an end 150b of the first radial dynamic pressure generating groove 150 at the second-radial-dynamic-pressure-generating-groove-152 side in the direction of the rotation axis R. In particular, the first air-liquid interface 312 is located between the first radial dynamic pressure generating groove 150 and the second radial dynamic pressure generating groove 152 in the direction of the rotation axis R.

Next, an explanation will be given of a manufacturing method of the rotating device 200 according to the second embodiment.

First, the base-side encircling member 102 is joined with the shaft 26. Moreover, the inner cylinder 1051 having predetermined dynamic pressure generating grooves formed at the inner periphery 1051a, the first thrust surface 1051d and the second thrust surface 1051e is joined with the outer cylinder 1052. Next, the shaft 26 is inserted in the inner periphery 1051a of the inner cylinder 1051. Thereafter, the hub-side encircling member 108 is joined at a predetermined upper location of the shaft 26. The external-side encircling member 206 is joined with a step 1052c of the outer cylinder 1052. The assembly in this condition is hereinafter referred to as a bearing assembly. Next, the bearing assembly is revealed in a reduced-pressure condition in order to remove air in the gap between the fixed body and the rotating body. Under the reduced-pressure condition, a predetermined amount of the lubricant 92 is applied to the gap between the external-side encircling member 206 and the hub-side encircling member 108 and the gap between the base-side encircling member 102 and the outer cylinder 1052. For example, the lubricant 92 can be applied thereto by discharging the lubricant 92 from a discharging nozzle moved close to the target. Next, the bearing assembly is returned to an atmospheric pressure condition in order to let the lubricant 92 to permeate the interior of the bearing assembly. As a result, the lubricant 92 permeates the gap between the fixed body and the rotating body and is present therebetween.

Next, respective positions of the first air-liquid interface 312 and the second air-liquid interface 316 in the direction of the rotation axis R are inspected in the bearing assembly. Respective positions of the air-liquid interfaces can be inspected by emitting laser light to the air-liquid interfaces and by checking reflected light. According to the rotating device 200 of the second embodiment, in the condition as the bearing assembly, the first air-liquid interface 312 and the second air-liquid interface 316 can be visually checked from the same direction. Hence, respective positions of the first air-liquid interface 312 and the second air-liquid interface 316 can be inspected by emitting laser light from the same direction. Accordingly, such an inspection needs no inversion of the bearing assembly upside down, which contributes to the downsizing of an inspection device, and to little work and effort for the inspection.

Conversely, the cylindrical magnet 32 is bonded and fixed to a cylindrical inner periphery 28f of substantially the cup-shaped hub 28. Moreover, the stacked core 40 with the coil 42 is bonded and fixed to an outer periphery 4ea of the base 4.

Next, the outer periphery 1052b of the outer cylinder 1052 of the rotating-body-side encircling member 105 is bonded and fixed to the hub opening 28b of the hub 28. Thereafter, the outer periphery 102bd of the base-side encircling member 102 is bonded and fixed to the through hole 4h. At this time, an adhesive is let cured while the tilting of a disk mounting face 28a of the hub 28 to the base 4 is maintained to an appropriate level. As a result, the tilting of the disk mounting face 28a of the hub 28 to the base 4 can be suppressed.

Next, other members are mounted, and a predetermined inspection is performed on the assembly, thereby manufacturing the rotating device 200.

The rotating device 200 employing the above-explained configuration has the same operation as that of the first embodiment. That is, such a configuration also can reduce the leak-out of the lubricant 92 due to the gravitational force acting on the lubricant 92 and a difference in pressure between the first air-liquid interface 312 and the second air-liquid interface 316. Moreover, the first radial dynamic pressure generating groove 152 and the second radial dynamic pressure generating groove 150 can be distant from each other in the direction of the rotation axis R, increasing the rigidity of the bearing.

<First Modified Example of Second Embodiment>

It is an essential fact whether or not a lubricant is correctly filled in manufacturing of rotating devices. Hence, inspection of the lubricant is always carried out, but depending on the specification of a rotating device, in order to deal with a manufacturing cost, a simplification of such an inspection is further desired. A first modified example below employs a configuration that further simplifies the inspection of the lubricant.

Figure 9:
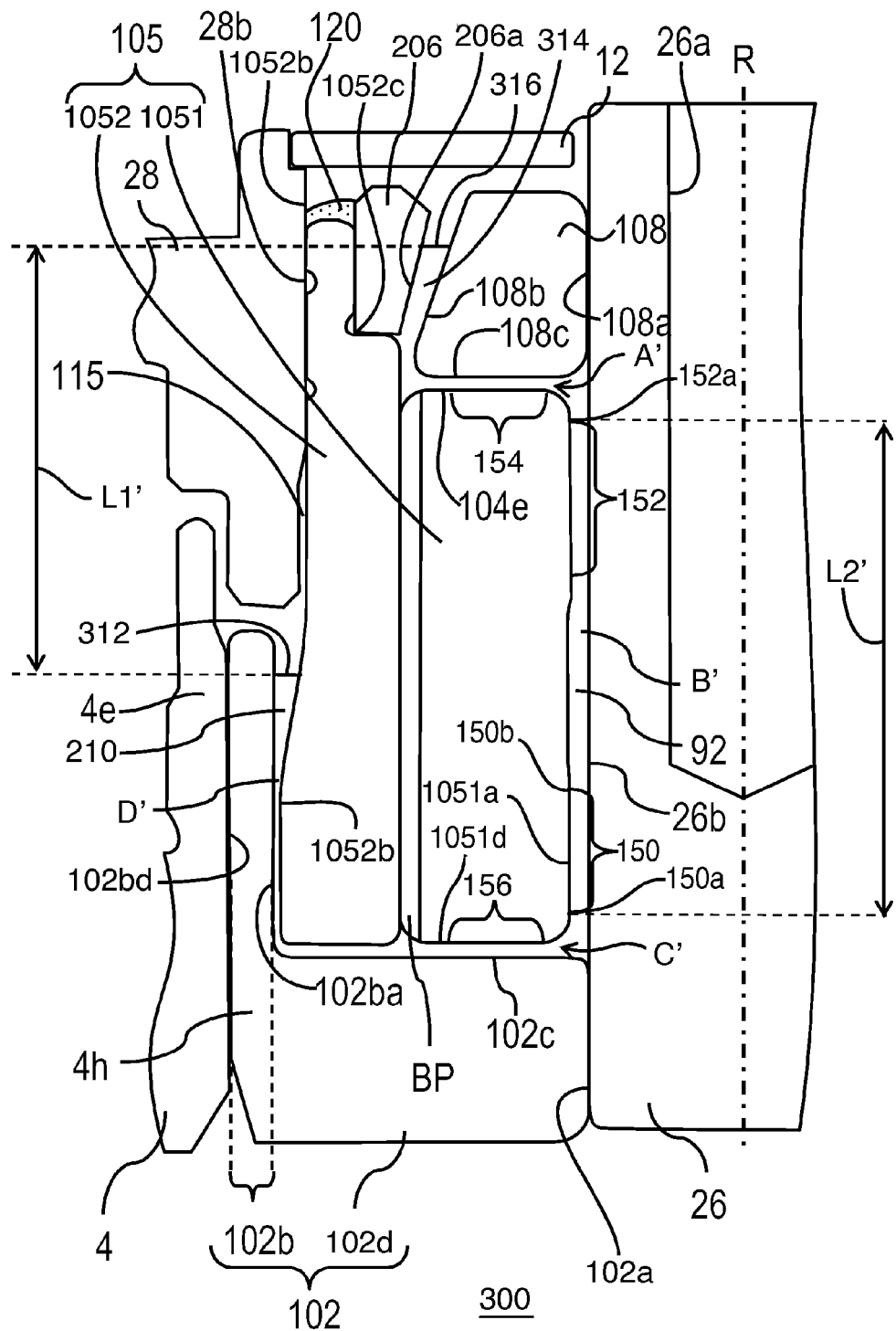
FIG. 9 is an enlarged cross-sectional view showing the periphery of a passage of a lubricant in an enlarged manner according to a first modified example of the second embodiment.

FIG. 9 is an enlarged cross-sectional view showing in an enlarged manner the periphery of a passage of a lubricant in a modified example 300 of the rotating device according to the second embodiment. According to the modified example 300, a portion of the outer cylinder 1052 contacting the hub opening 28b has a smaller diameter than a diameter of the innermost circumference of the first air-liquid interface 312.

That is, the innermost circumference of the first air-liquid interface 312 is located outwardly of the radial direction beyond the outermost circumference of a part of the outer cylinder 1052 contacting the hub opening 28b. As a result, before the hub 28 is fixed to the outer cylinder 1052, the first air-liquid interface 312 can be visually checked easily from the above. When it is inspected whether or not the lubricant 92 is insufficient, since visual checking is facilitated, the work and effort for such an inspection are little. Moreover, when laser light is emitted to inspect the position of the first air-liquid interface 312 in the axial direction, alignment of the laser light is easy, and thus the work and effort for such an inspection are little.

Moreover, the upper end of the external-side encircling member 206 is located above the upper end of the outer cylinder 1052. This results in reduction of a possibility that an adhesive 120 applied across the outer cylinder 1052 and the external-side encircling member 206 goes over the upper end of the external-side encircling member 206 and flows in a capillary seal 314. The adhesive 120 may be applied across the external-side encircling member 206, the outer cylinder 1052, and the hub 28.

<Second Modified Example of Second Embodiment>

Figure 10:
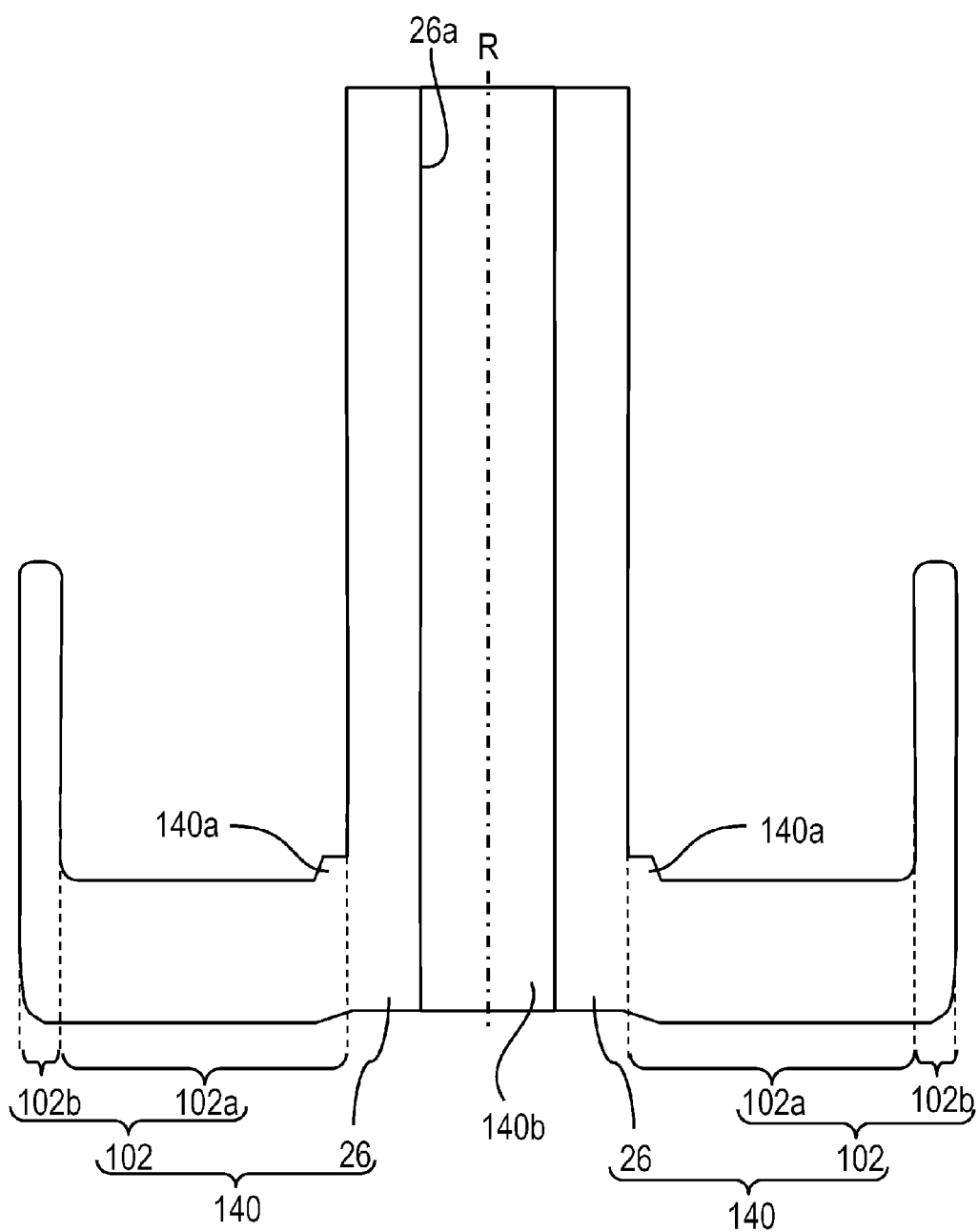
FIG. 10 is an enlarged cross-sectional view showing a base member having a shaft formed together with a base-side encircling member according to a second modified example of the second embodiment.

According to the second embodiment and the above modified example, the explanation was given of the case in which the shaft 26 is formed separately from the base-side encircling member 102, but the present invention is not limited to this configuration. FIG. 10 is an enlarged cross-sectional view showing a base-side member 140 including the shaft 26 formed integrally with the base-side encircling member 102 in the modified example 300 of FIG. 9. Since the number of parts can be reduced, the work and effort for assembling become little. Moreover, when the rotating device is formed to be thin, a high joined strength between the shaft 26 and the base-side encircling member 102 can be ensured.

In the example case shown in FIG. 10, the base-side member 140 is formed as a single piece from a stainless-steel material equivalent to JIS (Japanese Industrial Standards) SUS 430 by pressing, and the details thereof are finished by cutting, grinding, etc. The base-side member 140 may be formed of other materials and by other techniques in order to meet a desired specification. The shaft 26 is provided with a through hole 140b by pressing. A shaft fixing screw hole 26a is formed in the upper end side of the through hole 140b. A protrusive reinforced part 140a that increases the diameter is formed in a coupled part of the shaft 26 and the base-side encircling member 102. This suppresses a deformation of the coupled part when the rotating device 200 receives shock.

<Other Modified Examples>

The rotating devices according to the embodiments of the present invention were explained above. However, it should be understood for those skilled in the art that such embodiments are only to give an explanation, and various changes and modifications can be made within the scope and spirit of the present invention.

According to the second embodiment and the modified examples thereof, the shaft 26 and the hub-side encircling member 108 are separate parts. However, depending on an application, it is desirable to further improve the strength of the shaft, and integrated configuration of the shaft 26 and the hub-side encircling member 108 is possible in this case.

When such a configuration is employed, the strength further increases by integration. Moreover, the number of assembling processes can be reduced, and the leak-out of the lubricant from a fitted part of the shaft 26 and the hub-side encircling member 108 can be suppressed.

Moreover, according to such a configuration, in comparison with the modified example shown in FIG. 10, the precision of the outer diameter of the shaft can be easily accomplished by grinding.

According to the second embodiment and the modified examples thereof, the explanation was given of the case in which the external-side encircling member 106 is fixed to the inner periphery of the outer cylinder 103, but the present invention is not limited to this configuration. The external-side encircling member 106 may be fixed to, for example, the hub 28.

According to the second embodiment and the modified examples thereof, the explanation was given of the case in which the rotating-body-side encircling member 105 is formed by separately forming the inner cylinder 1051 and the outer cylinder 1052 and then joining those pieces together. However, the present invention is not limited to this configuration. For example, the inner cylinder 1051 and the outer cylinder 1052 may be integrally formed from the start.

According to the second embodiment and the modified examples thereof, although the explanation was given of the case in which the hub 28 and the rotating-body-side encircling member 105 are joined together, the present invention is not limited to this configuration. For example, the hub 28 and the rotating-body-side encircling member 105 may be integrally formed from the start. In this case, an outer periphery 28g of the hub 28 and the inner periphery 1051a may be successively cut and machined. This easily suppresses inconsistency of the center of the outer periphery 28g of the hub 28 and the center of the inner periphery 1051a of the rotating-body-side encircling member 105.

According to the first and second embodiments and modified examples thereof, although the explanation was given of the so-called outer rotor type having the cylindrical magnet 32 located outwardly of the stacked core 40, the present invention is not limited to this type. For example, the present invention can be applied to a so-called inner rotor type having a cylindrical magnet located inwardly of a stacked core.

Although the explanation was given of the case in which the stacked core is used in the first and second embodiments and the modified examples thereof, the core may be other than the stacked core.

What is claimed is:

1. A rotating device comprising:
    a fixed body including a base and a shaft fixed to the base;
    a rotating body including a hub on which a recording disk is to be mounted, and a rotating-body-side encircling member which is configured to rotate together with the hub and which encircles the shaft;
    a lubricant continuously present between the fixed body and the rotating body from a first air-liquid interface to a second air-liquid interface;
    first and second radial dynamic pressure generating grooves which are formed in a surface of the rotating-body-side encircling member where the lubricant contacts, and which generate radial dynamic pressure; and
    a stacked core including an annular part;
    wherein:
    the fixed body further includes a base-side encircling member comprising a disk part that encircles a base-side portion of the shaft and a cylinder part that encircles the rotating-body-side encircling member;
    the rotating body further comprises a recess that is provided in the rotating-body-side encircling member, above, in an axial direction, the first air-liquid interface of the lubricant provided in a gap between the cylinder part and the rotating-body-side encircling member, and that is concaved toward the shaft in a radial direction;
    the hub comprises a hub protrusion that protrudes toward the base and that encircles at least a part of the recess;
    the base comprises a cylindrical base protrusion to which a center hole of the annular part of the stacked core is fixed, the base protrusion protruding in the axial direction from the base toward the hub beyond an upper end of the cylinder part of the base-side encircling member, and encircling a part of the hub protrusion at a position beyond the upper end of the cylinder part; and
    the cylinder part is at least partially inserted into an opening provided in the base protrusion and is bonded and fixed to the opening.

2. The rotating device according to claim 1, wherein the disk part of the base-side encircling member has a thickness in the axial direction larger than a thickness of the cylinder part of the base-side encircling member in the radial direction.

3. The rotating device according to claim 1, wherein:
    the shaft is provided with a shaft hole formed along a rotation axis so as to open an upper end of the shaft, and
    the shaft hole runs over at least an area where one of the first and second radial dynamic pressure generating grooves is formed in the radial direction.

4. The rotating device according to claim 1, wherein a distance between the first and second air-liquid interfaces in the axial direction is shorter than a distance from a portion of the second radial dynamic pressure generating groove opposite to the first radial dynamic pressure generating groove to a portion of the first radial dynamic pressure generating groove opposite to the second radial dynamic pressure generating groove.

5. The rotating device according to claim 1, wherein:
    the lubricant is continuously present from the first air-liquid interface to the second air-liquid interface through the first radial dynamic pressure generating groove, and the second radial dynamic pressure generating groove, in this order, and
    the first air-liquid interface is located at a second-radial-dynamic-pressure-generating-groove side of the first radial dynamic pressure generating groove in the axial direction.

6. The rotating device according to claim 1, further comprising a first thrust dynamic pressure generating groove formed in either one of a surface of the fixed body and a surface of the rotating body, which surfaces face each other in the axial direction,
wherein the lubricant is continuously present from the first air-liquid interface to the second air-liquid interface through the first thrust dynamic pressure generating groove, the first radial dynamic pressure generating groove, and the second radial dynamic pressure generating groove in this order.

7. The rotating device according to claim 6, further comprising a second thrust dynamic pressure generating groove formed in either one of the surface of the fixed body and the surface of the rotating body, which surfaces face each other in the axial direction,
wherein the lubricant is continuously present from the first air-liquid interface to the second air-liquid interface through the first thrust dynamic pressure generating groove, the first radial dynamic pressure generating groove, the second radial dynamic pressure generating groove, and the second thrust dynamic pressure generating groove in this order.

8. The rotating device according to claim 1, wherein the first air-liquid interface contacts an inner periphery of the cylinder part.

9. The rotating device according to claim 1, wherein:
the fixed body further includes a hub-side encircling member which encircles a hub-side portion of the shaft and which is fixed to the shaft, and
the second air-liquid interface contacts an outer periphery of the hub-side encircling member.

10. The rotating device according to claim 1, wherein the recess is a space for catching the lubricant spilled out from the first air-liquid interface.

11. The rotating device according to claim 1, wherein:
the fixed body further comprises a hub-side encircling member which encircles a part of the shaft at a hub side, and which is fixed to the shaft; and
both of a surface of the hub-side encircling member and a surface of the rotating body contact the second air-liquid interface, said surfaces facing each other in the radial direction, and neither the surface of the hub-side encircling member nor the surface of the rotating body which contact the second air-liquid interface has a groove that generates dynamic pressure.

12. The rotating device according to claim 1, wherein:
a part of the base protrusion beyond the upper end of the cylinder part faces the hub protrusion in the radial direction to form a first gap;
an upper end of the base protrusion faces the hub in the axial direction to form a second gap;
the upper end of the cylinder part faces the hub in the axial direction to form a third gap; and
the first gap, the second gap, and the third gap are in communication with each other.

13. The rotating device according to claim 1, wherein:
an outer periphery of the rotating-body-side encircling member comprises a tapered face that is tapered toward the shaft in the radial direction;
the first air-liquid interface contacts both of an inner periphery of the cylinder part and the tapered face; and
the recess is concaved continuously from the tapered face toward the shaft in the radial direction.

14. A rotating device comprising:
a fixed body including a base and a shaft fixed to the base;
a rotating body including a hub on which a recording disk is to be mounted, and a rotating-body-side encircling member which is configured to rotate together with the hub and which encircles the shaft;
a lubricant continuously present between the fixed body and the rotating body from a first air-liquid interface to a second air-liquid interface;
first and second radial dynamic pressure generating grooves which are formed in a surface of the rotating-body-side encircling member where the lubricant contacts, and which generate radial dynamic pressure; and
a stacked core including an annular part;
wherein:
the fixed body further includes a base-side encircling member comprising a disk part that encircles a base-side portion of the shaft and a cylinder part that encircles the rotating-body-side encircling member;
the base comprises a cylindrical base protrusion to which a center hole of the annular part is fixed, the cylinder part being at least partially inserted in an opening provided in the base protrusion and being bonded and fixed to the opening;
an outer periphery of a part of the rotating-body-side encircling member encircled by the cylinder part comprises a straight face that runs substantially straight in an axial direction, and a tapered face that is continuous from the straight face toward the hub, tapered toward the shaft in a radial direction, and contacts the first air-liquid interface;
neither an inner periphery of the cylinder part, nor the straight face, nor the tapered face, has a groove that generates dynamic pressure; and
a distance in the axial direction between the first air-liquid interface and the second air-liquid interface is shorter than a distance between a side of the second radial dynamic pressure generating groove opposite to the first radial dynamic pressure generating groove and a side of the first radial dynamic pressure generating groove opposite to the second radial dynamic pressure generating groove.

15. The rotating device according to claim 14, wherein:
the lubricant is continuously present from the first air-liquid interface to the second air-liquid interface through the first radial dynamic pressure generating groove, and the second radial dynamic pressure generating groove in this order, and
the first air-liquid interface is located at a second-radial-dynamic-pressure-generating-groove side of the first radial dynamic pressure generating groove in the axial direction.

16. The rotating device according to claim 14, wherein:
the fixed body further comprises a hub-side encircling member that encircles a part of the shaft at the hub side, and that is fixed to the shaft; and
both of a surface of the hub-side encircling member and a surface of the rotating body contact the second air-liquid interface, said surfaces facing each other in the radial direction, and neither the surface of the hub-side encircling member nor the surface of the rotating body which contacts the second air-liquid interface has a groove that generates dynamic pressure.

17. The rotating device according to claim 14, wherein:
the hub comprises a hub protrusion that protrudes toward the base; and
the base protrusion protrudes in the axial direction from the base toward the hub beyond an upper end of the cylinder part of the base-side encircling member, and encircles at least a part of the hub protrusion.

18. The rotating device according to claim 17, wherein:
a part of the base protrusion beyond the upper end of the cylinder part faces the hub protrusion in the radial direction to form a first gap;
an upper end of the base protrusion faces the hub in the axial direction to form a second gap;
the upper end of the cylinder part faces the hub in the axial direction to form a third gap; and
the first gap, the second gap, and the third gap are in communication with each other.

19. A rotating device comprising:
a fixed body including a base and a shaft fixed to the base;
a rotating body including a hub on which a recording disk is to be mounted, and a rotating-body-side encircling member which is configured to rotate together with the hub and which encircles the shaft;
a lubricant continuously present between the fixed body and the rotating body from a first air-liquid interface to a second air-liquid interface;
first and second radial dynamic pressure generating grooves which are formed in a surface of the rotating-body-side encircling member where the lubricant contacts, and which generate radial dynamic pressure; and
a stacked core including an annular part;
wherein:
the fixed body further includes a base-side encircling member comprising a disk part that encircles a base-side portion of the shaft and a cylinder part that encircles the rotating-body-side encircling member;
the rotating body further includes a lubricant catching space that is provided in an area facing the first air-liquid interface of the lubricant provided in a gap between the cylinder part and the rotating-body-side encircling member, the area being located above the first air-liquid interface in an axial direction, and that catches a lubricant spilled out from the first air-liquid interface;
the hub further includes a hub protrusion that protrudes toward the cylinder part;
the lubricant catching space is defined by an inner periphery of the hub protrusion and an outer periphery of the rotating-body-side encircling member;
the base comprises a cylindrical base protrusion to which a center hole of the annular part is fixed, the base protrusion protruding in the axial direction from the base toward the hub beyond an upper end of the cylinder part of the base-side encircling member, and encircling a part of the hub protrusion at a position beyond the upper end of the cylinder part; and
the cylinder part is at least partially inserted in an opening provided in the base protrusion and is bonded and fixed to the opening.

20. The rotating device according to claim 19, wherein:
a part of the base protrusion beyond the upper end of the cylinder part faces the hub protrusion in the radial direction to form a first gap;
an upper end of the base protrusion faces the hub in the axial direction to form a second gap;
the upper end of the cylinder part faces the hub in the axial direction to form a third gap; and
the first gap, the second gap, and the third gap are in communication with each other.

* * * * *